United States Patent
Piscsalko et al.

(10) Patent No.: US 12,000,975 B2
(45) Date of Patent: *Jun. 4, 2024

(54) BOREHOLE INSPECTING AND TESTING DEVICE AND METHOD OF USING THE SAME

(71) Applicant: Pile Dynamics, Inc., Solon, OH (US)

(72) Inventors: George R. Piscsalko, Aurora, OH (US); Dean A. Cotton, Fairview Park, OH (US); Richard E. Berris, Jr., Chagrin Falls, OH (US); Tyler A Piedimonte, Cleveland, OH (US)

(73) Assignee: Pile Dynamics, Inc., Solon, OH (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/725,798

(22) Filed: Apr. 21, 2022

(65) Prior Publication Data

US 2022/0244422 A1    Aug. 4, 2022

Related U.S. Application Data

(63) Continuation of application No. 16/878,148, filed on May 19, 2020, now Pat. No. 11,340,379, which is a (Continued)

(51) Int. Cl.
*G01V 11/00* (2006.01)
*E02D 1/02* (2006.01)
(Continued)

(52) U.S. Cl.
CPC .............. *G01V 11/002* (2013.01); *E02D 1/02* (2013.01); *E21B 47/00* (2013.01);
(Continued)

(58) Field of Classification Search
CPC ........ G01V 9/00; G01V 11/002; E21B 47/00; E21B 47/085; E02D 1/02
See application file for complete search history.

(56) References Cited

U.S. PATENT DOCUMENTS 2,649,163 A * 8/1953 Atkins, Jr. ............ E21B 47/085
73/152.58
3,474,879 A   10/1969 Adair
(Continued)

FOREIGN PATENT DOCUMENTS

CN         1530646 A    9/2004
CN       106284443 A    1/2017
(Continued)

OTHER PUBLICATIONS

European Search Report for corresponding EP 16 83 7527, mailed Oct. 24, 2018, 7 pgs.
(Continued)

*Primary Examiner* — John Fitzgerald
(74) *Attorney, Agent, or Firm* — Rankin, Hill & Clark LLP

(57) ABSTRACT

An inspection system to measure the condition of at least a wall of a ground opening, the inspection system having a head unit for lowering into a borehole during a data collection phase wherein at least one set of test data is collected concerning one or more physical characteristics of the borehole during the data collection phase, the head unit having an internal measurement system and a sensor arrangement with a plurality of sensors facing radially outwardly of a head axis that is generally parallel to at least a portion of a borehole axis, the plurality of sensors allowing the head unit to be moved during the data collection phase without rotation about the head axis, the plurality of sensors at least partially producing the at least one set of test data collected during the data collection phase.

16 Claims, 14 Drawing Sheets

Related U.S. Application Data continuation of application No. 16/407,962, filed on May 9, 2019, now Pat. No. 10,690,805, which is a continuation of application No. 15/233,317, filed on Aug. 10, 2016, now Pat. No. 10,330,823, which is a continuation-in-part of application No. 14/560,879, filed on Dec. 4, 2014, now abandoned.

(60) Provisional application No. 62/205,335, filed on Aug. 14, 2015, provisional application No. 61/912,206, filed on Dec. 5, 2013.

(51) Int. Cl.
  *E21B 47/00* (2012.01)
  *E21B 47/002* (2012.01)
  *E21B 47/085* (2012.01)
  *G01V 9/00* (2006.01)

(52) U.S. Cl.
  CPC ........ *E21B 47/0025* (2020.05); *E21B 47/085* (2020.05); *G01V 9/00* (2013.01)

(56) References Cited

U.S. PATENT DOCUMENTS

| | | |
|---|---|---|
| 3,775,739 A | 11/1973 | Vogel |
| 3,820,384 A | 6/1974 | Brill |
| 4,079,625 A | 3/1978 | Mann |
| 4,091,661 A | 5/1978 | Handy et al. |
| 4,283,953 A | 8/1981 | Plona |
| 4,332,160 A | 6/1982 | Baragar et al. |
| 4,380,808 A | 4/1983 | Hill et al. |
| 4,400,970 A | 8/1983 | Ali |
| 4,539,851 A | 9/1985 | Lutenegger |
| 4,542,655 A | 9/1985 | Park et al. |
| 4,545,242 A | 10/1985 | Chan |
| 4,601,024 A | 7/1986 | Broding |
| 4,641,520 A | 2/1987 | Mao |
| 4,646,565 A | 3/1987 | Siegfried |
| 4,701,892 A | 10/1987 | Anderson |
| 4,733,380 A | 3/1988 | Havira |
| 4,806,153 A | 2/1989 | Sakai et al. |
| 4,867,264 A | 9/1989 | Siegfried |
| 4,947,683 A | 8/1990 | Minear et al. |
| 4,979,151 A | 12/1990 | Ekstrom et al. |
| 5,099,696 A | 3/1992 | Yabuuchi |
| 5,127,261 A | 7/1992 | Ingram et al. |
| 5,164,548 A | 11/1992 | Angehm |
| 5,198,770 A | 3/1993 | Decorps et al. |
| 5,608,169 A | 3/1997 | Fujioka et al. |
| 5,978,749 A | 11/1999 | Likins, Jr. et al. |
| 5,987,385 A | 11/1999 | Varsamis et al. |
| 6,041,860 A | 3/2000 | Nazzal et al. |
| 6,058,874 A | 5/2000 | Glenning et al. |
| 6,176,323 B1 | 1/2001 | Weirich et al. |
| 6,241,028 B1 | 6/2001 | Bijleveld et al. |
| 6,301,551 B1 | 10/2001 | Piscalko et al. |
| 6,308,787 B1 | 10/2001 | Alft |
| 6,480,118 B1 | 11/2002 | Rao |
| 6,491,115 B2 | 12/2002 | Van Houwelingen et al. |
| 6,533,502 B2 | 3/2003 | Mcvay et al. |
| 6,604,432 B1 | 8/2003 | Hamblen et al. |
| 6,655,220 B1 | 12/2003 | Reiffsteck |
| 6,783,273 B1 | 8/2004 | Mullins et al. |
| 6,912,903 B2 | 7/2005 | Hamblen et al. |
| 6,931,952 B2 | 8/2005 | Rantala et al. |
| 7,187,620 B2 | 3/2007 | Nutt et al. |
| 7,187,784 B2 | 3/2007 | Tawfiq et al. |
| 7,495,995 B2 | 2/2009 | Hayes |
| 7,872,947 B2 | 1/2011 | An et al. |
| 7,921,730 B2 | 4/2011 | Tan |
| 8,065,813 B2 | 11/2011 | Siepi |
| 8,100,196 B2 | 1/2012 | Pastusek et al. |
| 8,151,658 B1 | 4/2012 | Ding |
| 8,169,477 B2 | 5/2012 | Tawfiq et al. |
| 8,382,369 B2 | 2/2013 | Piscsalko et al. |
| 9,217,324 B2 | 12/2015 | Hayes |
| 9,249,559 B2 | 2/2016 | Dyer et al. |
| 9,291,048 B2 | 3/2016 | MacPhail et al. |
| 9,720,121 B2 | 8/2017 | Zhou et al. |
| 10,099,988 B2 | 10/2018 | Farmer et al. |
| 10,132,954 B2 | 11/2018 | Donderici |
| 10,690,805 B2 | 6/2020 | Piscsalko et al. |
| 10,838,097 B2* | 11/2020 | Dollfus ............... E21B 47/085 |
| 11,015,426 B2* | 5/2021 | Avasarala ............ E21B 47/003 |
| 11,136,879 B2* | 10/2021 | Avasarala ............ G03B 37/005 |
| 11,215,544 B2* | 1/2022 | Mullins ................... G01N 9/04 |
| 11,753,924 B2* | 9/2023 | Avasarala ............ E21B 47/002 |
| | | 348/85 |
| 2003/0121338 A1 | 7/2003 | Yates |
| 2005/0011645 A1 | 1/2005 | Aronstam et al. |
| 2005/0241825 A1 | 11/2005 | Burris et al. |
| 2006/0173627 A1 | 8/2006 | Haugland |
| 2006/0194537 A1 | 8/2006 | Mccoy |
| 2007/0052551 A1 | 3/2007 | Lovell et al. |
| 2007/0152054 A1 | 7/2007 | Bonavides et al. |
| 2007/0223822 A1 | 9/2007 | Haugland |
| 2009/0146835 A1 | 6/2009 | Xu et al. |
| 2010/0095757 A1 | 4/2010 | Hansen |
| 2012/0203462 A1 | 8/2012 | Dalton et al. |
| 2013/0000399 A1 | 1/2013 | Lilly et al. |
| 2013/0128697 A1 | 5/2013 | Contant et al. |
| 2013/0168081 A1 | 7/2013 | Yang et al. |
| 2013/0168085 A1 | 7/2013 | Fraser |
| 2013/0192359 A1 | 8/2013 | Pelletier et al. |
| 2013/0306374 A1 | 11/2013 | Wood |
| 2014/0012506 A1 | 1/2014 | Adsit |
| 2014/0022088 A1 | 1/2014 | Chau et al. |
| 2014/0027113 A1 | 1/2014 | Veeningen |
| 2014/0043938 A1 | 2/2014 | Sinha |
| 2014/0182845 A1 | 7/2014 | Roberson et al. |
| 2014/0312906 A1 | 10/2014 | Gold |
| 2015/0109886 A1 | 4/2015 | Mekic et al. |
| 2015/0204993 A1 | 7/2015 | Leggett et al. |
| 2015/0211353 A1 | 7/2015 | Ding |
| 2015/0233230 A1 | 8/2015 | Likins, Jr. et al. |
| 2015/0268367 A1 | 9/2015 | Khajeh et al. |
| 2015/0281848 A1 | 10/2015 | Khajeh et al. |
| 2016/0348500 A1 | 12/2016 | Piscsalko et al. |
| 2017/0108611 A1 | 4/2017 | Vasquez |
| 2019/0203583 A1* | 7/2019 | Øy ........................ G01S 13/26 |
| 2019/0339411 A1* | 11/2019 | Dollfus ................... G01V 1/50 |

FOREIGN PATENT DOCUMENTS

| | | |
|---|---|---|
| JP | 02157391 A | 6/1990 |
| JP | H03281891 A | 12/1991 |
| JP | H0525987 A | 2/1993 |
| KR | 200292852 Y1 | 10/2002 |
| KR | 100860591 B1 | 9/2008 |
| KR | 20170008994 A | 1/2017 |

OTHER PUBLICATIONS

Chinese Search Report for corresponding CN 201680047584.5, mailed Dec. 7, 2018, 6 pgs.
Korean Notice of Allowance for corresponding KR 10-2018-7004496, dated Feb. 22, 2019, 5 pgs.
International Search Report for corresponding PCT/US2016/46344, mailed Oct. 31, 2016, 2 pgs.
Korean Intellectual Property Rights Information Services data,: KR 20-0292852, published Oct. 9, 2002, 2 pgs.
Japan Notification of Reasons for Rejection for corresponding 2018-506548, mailed Aug. 28, 2018, 4 pgs.
International Search Report for corresponding PCT/US2015/029601, mailed Jul. 28, 2015, 11 pgs.
Espacenet Bibliographic data: JP (H03281891 A), Published Dec. 12, 1991, 1pg.

(56) References Cited

OTHER PUBLICATIONS

Espacenet Bibliographic data: JP (H0525987 A), Published Feb. 2, 1993, 1pg.

* cited by examiner

BOREHOLE INSPECTING AND TESTING DEVICE AND METHOD OF USING THE SAME

This application is a continuation of patent application Ser. No. 16/878,148 that was filed on May 19, 2020, which is a continuation of patent application Ser. No. 16/407,962 that was filed on May 9, 2019, which is a continuation of patent application Ser. No. 15/233,317 that was filed on Aug. 10, 2016, which claims priority in U.S. Provisional Patent Application Ser. No. 62/205,335, filed on Aug. 14, 2015. In addition, U.S. patent application Ser. No. 15/233,317 is a Continuation-in-Part application of U.S. patent application Ser. No. 14/560,879 that was filed on Dec. 4, 2014, which claims the benefit of Provisional Application Ser. No. 61/912,206 that was filed on Dec. 5, 2013. All of these prior filings are incorporated by reference herein.

The invention of this application relates to a borehole measuring device. More particularly, the invention of this application relates to a measuring device that can be deployed in a borehole to inspect the borehole, in particular, to inspect the shaft bottom and/or side walls of the borehole and provide fast and reliable information about the quality and bearing capacity of the soils in the borehole.

INCORPORATION BY REFERENCE

McVay et al.—U.S. Pat. No. 6,533,502 discloses a wireless apparatus and method for analysis of piles which is incorporated by reference herein for showing the same. In addition, Mullins et al.—U.S. Pat. No. 6,783,273 discloses a method for testing integrity of concrete shafts which is also incorporated by reference in this application for showing the same. Piscsalko et al.—U.S. Pat. No. 6,301,551 discloses a remote pile driving analyzer and is incorporated by reference in this application for showing the same. Likins Jr. et al.—U.S. Pat. No. 5,978,749 discloses a pile installation recording system and is incorporated by reference in this application for showing the same. Piscsalko et al.—U.S. Pat. No. 8,382,369 discloses a pile sensing device and method of using the same and is incorporated by reference in this application for showing the same. Dalton et al.—Publ. No. 2012/0203462 discloses a pile installation and monitoring system and method of using the same and is incorporated by reference in this application for showing the same.

Ding—U.S. Pat. No. 8,151,658 discloses an inspection device for the inspection of an interior bottom of a borehole which is incorporated by reference herein for showing the same. Tawfiq et al. U.S. Pat. No. 7,187,784 discloses a borescope for drilled shaft inspection and is incorporated by reference herein for showing the same. In addition, Tawfiq et al. U.S. Pat. No. 8,169,477 discloses a digital video borescope for drilled shaft inspection and is incorporated by reference herein for showing the same.

BACKGROUND OF THE INVENTION

Applicant has found that the invention of this application works particularly well with the drilling and inspection of drilled pile shafts wherein this reference is being used throughout this application. However, this application is not to be limited to drilled pile shafts wherein reference to piles in this application is not to limit the scope of this application. "Piles" can equally refer to drilled shafts or other deep foundation elements. Application to shallow foundations is also useful.

Sensing apparatuses have been used in the building and construction industry for a number of years. These sensing apparatuses include a wide range of devices used for a wide range of reasons in the field. These devices include sensing devices that are used in connection with the installation and use of supporting elements such as piles that are used to support the weight of superstructures such as but not limited to supporting the weight of buildings and bridges. As can be appreciated, it is important to both ensure that a supporting foundation element, such as a pile, has been properly formed and installed and that structurally it is in proper condition throughout its use in the field. It must also have sufficient geotechnical bearing capacity to support the applied load without excessive settlement.

With respect to the installation of piles, it is important that these structures be properly constructed so that the pile can support the weight of a building or superstructure. Thus, over the years, systems have been designed to work in connection with the installation of a pile to ensure that this pile meets the building requirements for the structure. These include sensing devices that work in connection with the driving of a pile as is shown in Piscsalko et al., U.S. Pat. No. 6,301,551. Again, the Piscsalko patent is incorporated by reference herein as background material relating to the sensing and driving of structural piles. These devices help the workers driving these piles to determine that the pile has been properly driven within the soil without over stressing the pile during the driving process, and assure the supervising engineer that the pile meets all design requirements including adequate geotechnical bearing capacity.

Similarly, devices are known which are used to monitor the pile after it is driven. This includes the Piscsalko patents which include devices that can be used to monitor the pile even after the driving process. Further, Mcvay, et al., U.S. Pat. No. 6,533,502 also discloses a device used to monitor a pile during or after the driving process is completed. The information produced by the systems can be used to determine the current state of the pile, including the geotechnical bearing capacity, and for determining a defect and/or damage, such as structural damage, that may or may not have incurred in response to any one of a number of events including natural disasters.

In addition, it is known in the art that devices can be used to help determine the structural integrity of a poured pile wherein the pouring of the pile and the quality of this pouring can determine the structural integrity of the pile once a poured material like concrete has cured. Mullins, et al., U.S. Pat. No. 6,783,273 attempts to measure this integrity of a poured pile by disclosing a system and method for testing the integrity of concrete shafts by moving a single thermal sensor arrangement up and down in a logging tube during the curing cycle of the concrete in the poured pile. Piscsalko U.S. Pat. No. 8,382,369 discloses an alternative to the Mullins device and discloses a thermal pile sensing device that includes one or more sensor strings, each with multiple thermal sensors, that are capable of monitoring the entire pile generally simultaneously and over a period of time and can create two or three dimensional images, in real time, based on the curing of the poured material to assess structural integrity and/or other structural characteristics.

However, while the prior art disclosed above can effectively measure the integrity of the pile and certain aspects of the borehole during or after the pouring of the pile, the bearing capacity of the pile is also and more usually dependent on the condition of the soil around the length of the shaft and below the bottom borehole before the pile is poured. The bearing capacity at the bottom of the borehole relates to condition of the soil at the bottom of the borehole wherein loose soil has less bearing capacity than soils that are undisturbed or dense. Loose soil also contributes to undesirable increased settlement of the supported structure. Thus, it is best to reduce the amount of loose soil at the bottom of the borehole. In view of the difficulties associated with viewing the bottom of a borehole that can be many meters below the ground surface, and frequently in an opaque slurry condition consisting of suspended clay particles mixed in water, or possibly a liquid polymer mixture, it is common practice to employ a so-called "clean-out bucket" to reduce the amount of unsuitable bearing material, such as loose soil, at the shaft bottom. This procedure requires replacing the drilling equipment with the clean-out bucket which is then lowered into the borehole. The success of the bottom cleaning is, however, not assured and several passes or cycles of this effort may be needed. The uncertainty can lead to unnecessary effort and, therefore, cost. Throughout the remaining specification of this application, the terminology "debris layer" and/or "debris" will be used to generally define the unsuitable bearing material above the bearing layer. The unsuitable bearing material includes, but is not limited to, loose soil, loose material, soft material and/or general debris. The debris together forms the debris layer.

The devices disclosed in the Tawfiq patents and the Ding patent attempt to overcome these problems by making it possible to inspect the bottom of the borehole and reduce the number of cycles and therefore the time needed for secondary operations, and/or reduce the required additional capacity above the design load to the minimal sufficient margin. Or, at least to confirm that the secondary cleaning operations were successful. Another such device is the Drilled Shaft Inspection Device (SID) produced by GPE, Inc. More particularly, these systems are configured to only visually inspect the borehole before the pile is poured. None of these systems can be used to estimate the capacity of the bearing layer or assure a satisfactory soil condition at the bottom of the borehole. With respect to the Tawfiq systems, they are complicated and heavy systems that are costly to operate in the field. One such problem is that the weight of Tawfiq's system requires the use of large cranes or pulley systems to lower the Tawfiq's system into the borehole, and further to move and assess multiple locations on the bottom surface. Ding attempts to overcome the heavy system shortcomings in Tawfiq by the use of a simple system that is lighter and purely mechanical in design. In this respect, Ding's system is essentially like a hand tool that must be operated by specially trained operators and operated at or near the borehole by these operators wherein the operator must cautiously work near an open borehole. In operation, these operators must manually and carefully lower the Ding system into a borehole without bumping the side wall since any movement of the bottom plate before it reaches the bottom of the borehole could require the system to be retrieved to the surface and reset. In this respect, Ding utilizes manual plate movements to measure the depth of the debris layer at the bottom of the borehole, and retrieving the device after each measurement to record the result prior to deploying the device again to measure the next bottom location. While Ding overcomes some of the complexity, weight and costs associated with the Tawfiq systems, the Ding system is significantly more labor intensive since each measurement requires the system to be completely removed from the borehole and the displacement of the bottom plate visually determined and manually reset. For larger boreholes, this can be numerous iterations to sufficiently measure the entire bottom of the borehole wherein each iteration requires the device to be completely removed from the hole. For deep shafts, the time to retrieve and redeploy is substantial. Yet further, the Ding system is designed only to measure the height of debris layer at the bottom of the borehole; it is not capable or configured for other measurements. In fact, it is too light and thus incapable of measuring load bearing characteristics of the soil in the bearing layer. While for other reasons, the other systems discussed above are also not capable of measuring load bearing characteristics. As a result, Ding's attempts to simplify his system over the prior art ultimately resulted in greatly increased labor cost to operate his system. In addition, Ding's simplified system also results in a reduced amount of data that can be obtained since his system can only measure the amount of debris. Yet further, Ding's simplified system necessitates highly skilled operators to operate his system and to operate the system near the open borehole. Thus, while Ding overcomes some of the complexity issues relating to the prior art, it creates new and different problems in the art. Most importantly, however, both the Tawfiq and the Ding devices require skilled personnel, not necessarily skilled in safe construction work practices, to approach and work next to a large borehole, either filled with slurry or empty. This is generally not advisable, and in some instances, not permitted on a construction site. Additionally, these systems only attempt to measure the debris layer on the bottom of the borehole, but none of the prior art can give any indication of the capacity of the soil of the bearing layer, or of the condition of the sidewall.

Therefore, there is still a need for a system to inspect and test a borehole's soil strength before a pile is poured that reduces the complexity and cost of the system without adversely increasing labor costs by requiring highly skilled operators at the jobsite for long periods of time and working near the borehole. Yet further, there is a need for a system that makes it less costly to inspect and test the borehole bottom and/or sides and reduces the need for, or time required by, the secondary excavating system to clean up the debris on the bottom of the borehole.

SUMMARY OF THE INVENTION

The invention of this application relates to a borehole inspection device; and more particularly, to a borehole or shaft hole inspection device and system.

More particularly, the invention of this application relates to a borehole inspection that can quickly and accurately measure the debris layer in a borehole.

According to one aspect of the present invention, provided is a device which produces load-set curves or load versus displacement curves for one or more locations of the shaft bottom and/or sides to give the construction professional quick and reliable information about the quality and bearing capacity of the soils underneath the shaft bottom and/or the condition of the side walls of the shaft. Due to uncertainty in the bottom of shaft condition, a designer often ignores end bearing and relies only on resistance along the side of the shaft when assessing the bearing capacity of the shaft. By using the device of this application, designers can with more confidence include end bearing in their design and thus potentially save significant amounts of money in the overall cost of the pile. This is particularly important when the shaft has to carry end bearing.

More particularly, in one set of embodiments, the device can measure soil resistance by utilizing a reaction load and this reaction load can be a substantial reaction load produced by the weight of the already present and massive drilling equipment.

According to yet another aspect of the invention of this application, this device can measure a reaction load to both determine the depth of the debris layer on the surface of the bottom of the borehole bottom and measure the load capacity of the bearing layer of the borehole below the debris layer.

According to a further aspect of the invention of this application, the device can measure one or more conditions of the side of the borehole wherein the designer can with more confidence design for bearing capacities and thus potentially save more money by justifiably reducing the safety margin (by either decreasing the assumed ultimate bearing capacity or increasing the design load since in either case the actual capacity is then better known).

According to even yet another aspect of the invention of this application, the device can use the weight of the drilling equipment as a reaction load. In fact, the device is conceived in such a way that it allows quick connection to the drilling equipment, which is already present on site to drill the foundation hole, and in that way it eliminates the need for setting up cumbersome additional equipment and reduces to a minimum any time delays between the end of the drilling process and the beginning of concrete casting. Yet further, the device of this application is therefore built such that it can be handled by the contractors' skilled personnel who are trained to be around a borehole and allow the analyzers of the data to supervise the operation and analyze the data without ever going near the borehole, maybe as far away as in their office.

According to a further aspect of the invention of this application, the device can include multiple sensors and these multiple sensors can detect and test more than one characteristic of the borehole.

According to another aspect of the invention of this application, this device can be configured to quickly connect to the drilling equipment wherein separate and independent lowering systems are not required thereby eliminating the need for setting up cumbersome additional equipment and reducing to a minimum any time delays between the end of the drilling process and the beginning of concrete casting.

According to yet another aspect of the invention of this application, the device can include both force and displacement sensors thereby measuring both the amount of debris and/or the bearing capacity of the bearing layer of the borehole bottom and/or sides.

According to yet other aspects of the present invention, the device can include the sensing on a device head that is lowered into the borehole and a readout system spaced from the head that can be in communication with the device head (by wired, wireless, and/or underwater wireless systems) that can display real time data viewable by the operator of the device, personnel on site and/or personnel off site thereby preventing the system from being removed from the borehole for each location tested on the borehole bottom, thus improving efficiency and reducing the time required for testing.

According to even yet other aspects of the invention, the testing device can be joined relative to a cleanout bucket thereby creating a combination debris cleaning and layer testing device.

According to yet a further aspect of the invention, provided is a device that can measure and determine at one or more points simultaneously:

The thickness of the debris layer and its strength
The strength of the bearing layer below the debris layer
The elastic modulus of the bearing layer
The uniformity of the debris layer and/or the bearing layer
The strength and/or condition of the sides of the borehole According to yet other aspects of the invention, the borehole inspection device or system has a configuration that allows it to be operated "wirelessly" as is defined by the application, but this is not required. Yet further, it can quickly and accurately measure the condition of the borehole including, but not limited to, accurately measure and/or determine the configuration of the bottom and/or side wall(s) of the opening or excavation to provide fast and reliable information about the quality, shape, radius and/or verticality of the borehole and/or excavation.

According to one aspect of the present invention, provided is a system that includes a scanner or sensor arrangement that can be directed within the borehole, excavation or shaft hole to scan, sense and/or detect the surfaces of the bottom and/or sides of the borehole to determine one or more characteristics of the opening.

According to another aspect of the present invention, provided is a system that includes a sensor arrangement that can be essentially a self contained sensor arrangement that can be directed within the borehole or opening. In that the sensor arrangement can be self contained, the device can be a "wireless" device wherein the self contained device is directed into the borehole.

In one set of embodiments, the sensor arrangement can communicate wirelessly with an operator and/or system outside of the borehole and/or off site. As will be discussed throughout this application, a "wireless" system can be any system that allows the downhole portion of the device to be used without being hard wired to an external system not lowered in the borehole. This can include, but is not limited to, a) use of a wireless operating and/or communication arrangement that allows the downhole portion of the system to be operated independent of and/or communicate with external system(s) without communication wires and b) includes a data management system that allow the downhole portion of the system to be self contained and communicate data after a data measurement cycle is completed and, the downhole portion is removed from the borehole and/or after the downhole portion returns to the surface of the borehole. The preferred versions of these arrangements will be discussed more below and these preferred versions are intended to be examples only and are not intended to limit this application.

In another set of embodiments, the sensor arrangement can retain data and then communicate that data on demand. This can include, but is not limited to, communicating the data after the system has cycled through the borehole and the sensor arrangement is at least partially removed from the borehole. While not preferred, a wired communication system could be utilized for this communication of data.

According to yet another aspect of the present invention, provided is a system that includes a sensor arrangement that is mountable to a Kelly Bar, the main line or cable used in the excavation and/or boring, and/or any other lowering device known in the industry that is used to dig, excavate, bore and/or clean out the borehole and/or excavation. By using wireless technology and/or a self contained design, the system can be deployed more quickly than prior systems. Yet further, any wireless technology and/or data management systems could be used with the device of this application.

According to even yet another aspect of the present invention, provided is a system that can include a self contained sensor arrangement, which is configured for inspecting a borehole. Further, the system includes a —sensor arrangement that eliminates the need to rotate the device in the borehole, which is necessary in the prior art. As can be appreciated, this can further simplify the system. Further, it can improve accuracies and response times compared to existing systems.

According to further aspects of the present invention, provided is a system for inspecting a borehole that includes a sensor arrangement having circumferentially spaced sensors and/or testing devices that are circumferentially spaced about a device or head axis and extend radially outwardly from the device or head axis. This has been found to further reduce the need to rotate the device by allowing the sensor arrangement to simultaneously test at least a large portion of the borehole wall(s) around the entire sensor device. Further, this can include multiple sets of sensors that are staggered relative to one another to allow for a greater portion of the borehole wall(s) to be scanned simultaneously. In one set of embodiments, the multiple sets could be axially spaced from one another along the head axis.

According to yet other aspects of the present invention, provided is a system for inspecting a borehole that includes a sensor arrangement that includes multiple sets of sensors that are configured for different conditions found within the borehole. In this respect, one set of sensors (that includes one or more first sensors) could be configured for dry environments while one or more other sets of sensors (that includes one or more second sensors, etc.) could be configured for wet or slurry environments.

According to other aspects of the present invention, provided is a system for inspecting a borehole that includes a sensor arrangement that includes sensors, receivers and/or reference members at known spacings that can be used to measure changes in the slurry density and/or wave speeds as the device is lowered into the borehole.

According to yet even other aspects of the present invention, provided is a system for inspecting a borehole that includes a depth measurement system and/or depth control system. The depth measurement system and/or depth control system can include multiple pressure sensors. In a preferred arrangement, this system includes at least two pressure sensors that are at known spacings to one another and axial spaced from one another by a known spacing. The depth measurement system can include one or more accelerometers, one or more altimeters, timers, clocks, rotary encoders, or any other depth measuring systems known to calculate and/or measure depth of the sensor arrangement. As with other aspects of the system and/or arrangement, the calculated/measured depth can be stored and/or selectively communicated to other parts of the system.

According to further aspects of the present invention, the system can include one or more accelerometers and/or one or more altimeters to determine the verticality of the system within the borehole. Further, the verticality measurements of the scanner system can be used to complement scanner system measurements. Yet further, the system can further include a rotary encoder fixed relative to a Kelly Bar (or other lowering device) that can measure depth either independently and/or in combination with other devices including, but not limited to, pressure sensors(s), accelerometers, timers, clocks and/or altimeters. When used in combination, the rotary encoder can be synced with the pressure sensor(s), accelerometers, timer, clocks and/or altimeters to further improve accuracies in depth measurement.

According to even yet other aspects of the present invention, the depth of the system within the borehole can be calculated, at least in part, using two or more pressure sensors having known vertical spacings wherein the pressure sensors can work together to detect depth. The depth is detected based on the changes in the slurry density and this can be used to determine the depth of the sensor arrangement.

According to yet further aspects of the present invention, the use of rotary encoder, pressure sensors, accelerometers, timers, clocks and/or altimeters, in combination with other aspects of the invention and/or wireless technology eliminates the need for wires and/or lines connecting the lowered device to surface systems and/or operator(s) monitoring the borehole inspection on site or off site during data collection.

According to other aspects of the present invention, a timing system can be included to synchronize one or more components of the sensor system thereby allowing the system to be "wireless." In this respect, the system can include a lower arrangement that is configured to lower the sensor arrangement into the borehole. The lower arrangement can include a lowering timer and the sensor arrangement can include a sensor timer. The lowering timer and the sensor timer can be synchronized. Moreover, sensor data can be measured as a function of time and depth can be measured as a function of time wherein the sensor data and the depth data can then be synchronized with respect to time to determine the depth of the sensor data. This data can then be communicated by wire and/or wirelessly during and/or after the test to allow wireless operation during the data collection phase.

According to even yet further aspects of the present invention, the use of rotary encoders, accelerometers, timers, clocks and/or altimeters in combination with wireless technology better allows for semi-automation and/or full automation of the inspection process. Yet further, multiple boreholes could be inspected simultaneously with a device and system of this application by a single operator and/or single operating system.

According to another aspect of the invention of this application, the devices of this application can also work in combination with other systems for borehole inspection. This can include, but is not limited to devices used to measure the bearing capacity of the soils underneath the shaft bottom and/or the bearing capacity the side walls of the shaft opening.

More particularly, in one set of embodiments, the system can work in combination with devices configured to measure soil resistance by utilizing a reaction load and this reaction load can be a substantial reaction load produced by the weight of the already present and massive drilling equipment.

According to yet another aspect of the invention of this application, the system can work in combination with devices that can measure a reaction load to both determine the depth of the debris layer on the surface of the bottom of the borehole bottom and measure the load capacity of the bearing layer of the borehole below the debris layer.

According to a further aspect of the invention of this application, the system can work in combination with devices that can measure the bearing capacities of the side wall and thus potentially save more money by justifiably reducing the safety margin as the bearing capacity is better known).

According to a further aspect of the invention of this application, the system can include multiple sensors and these multiple sensors can detect and test more than one characteristic of the borehole. As noted above, the use of multiple sensors can also prevent the need for the rotation of the device.

According to another aspect of the invention of this application, the system can be configured to quickly connect to the drilling equipment wherein separate and independent lowering systems are not required thereby eliminating the need for setting up cumbersome additional equipment and reducing to a minimum any time delays between the end of the drilling process and the beginning of concrete casting.

According to yet another aspect of the invention of this application, the system can work in combination with devices that include both force and displacement sensors thereby measuring both the amount of debris and/or the bearing capacity of the bearing layer of the borehole bottom and/or sides.

According to yet other aspects of the present invention, the system can include the sensing on the head unit that is lowered into the borehole and a surface system (on site or off site) that can be in communication with the head unit and that can display real time data viewable by the operator of the device, personnel on site and/or personnel off site thereby preventing the system from being removed from the borehole for each location tested on the borehole bottom, thus improving efficiency and reducing the time required for testing.

These and other objects, aspects, features, advantages and developments of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
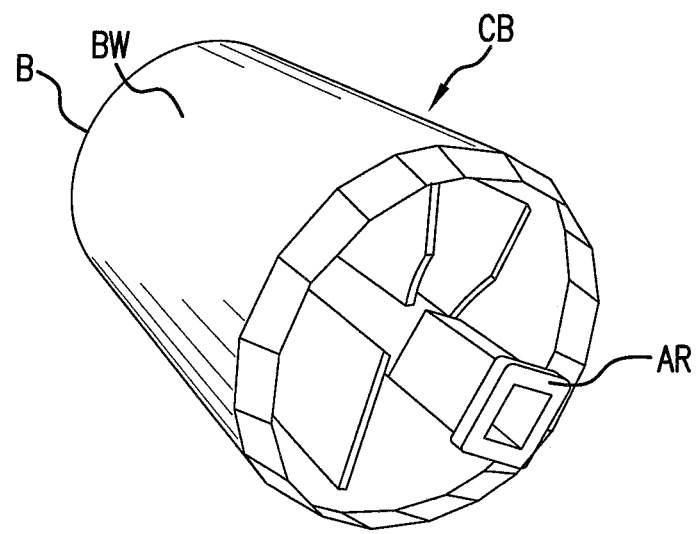
FIG. 1 is a perspective view a prior art cleanout bucket utilized to clean the bottom surface of a borehole.
Figure 2:
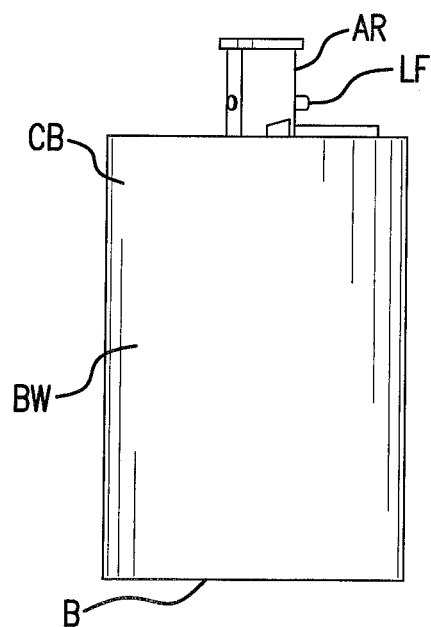
FIG. 2 is a side elevational view the prior art cleanout bucket shown in FIG. 1.

Referring now to the drawings wherein the showings are for the purpose of illustrating preferred and alternative embodiments of the invention only and not for the purpose of limiting the same, FIGS. 1 and 2 show a prior art clean out bucket CB which includes a mounting arrangement AR configured to selectively secure the bucket to a drilling mast, drillstem or Kelly bar (not shown in these figures). These masts have a square cross-sectional configuration wherein the mounting arrangement can be sized to slide over the mast and includes a locking features LF to secure the bucket relative to the mast. However, any attachment configuration could be used without detracting from the invention of this application. By including a square configuration, the mast can impart a rotational force on the bucket. The bucket further includes one or more side walls BW and a bottom B having a blade and a blade opening (both not shown). In operation the bucket is rotated such that the blade directs debris (which includes the unsuitable bearing material including, but is not limited to, loose soil, loose material, soft material and/or general debris) through the blade opening into the interior of the bucket. The bucket's function is to remove any debris on the bottom of the borehole to provide a clean bearing layer surface in the borehole. If the borehole is substantially larger than the diameter of the bucket, the operator can move the bucket about the borehole bottom to clean all or most of the borehole bottom. Removing the "debris" contributes to increased end bearing and reduced settlement of the supported structure.

Figure 3:
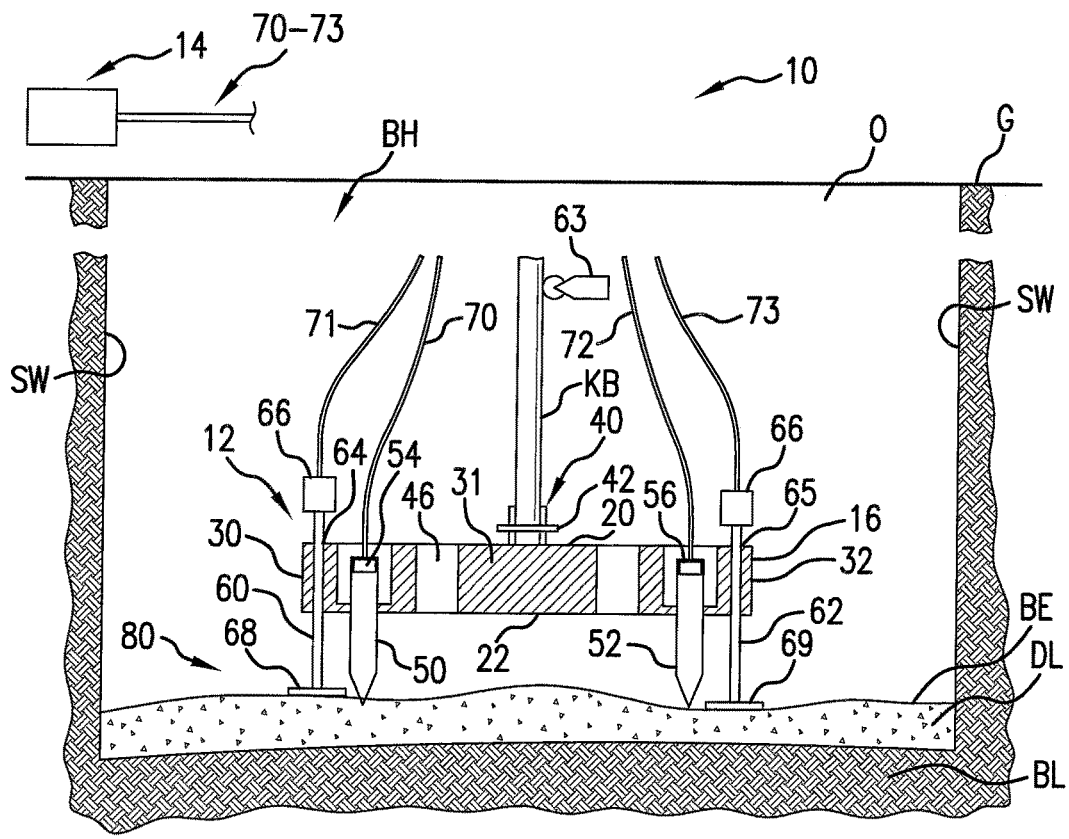
FIG. 3 is an elevational view taken at the bottom of a borehole and which shows an embodiment of the invention of this application at a set or initial engagement point.

With reference to FIG. 3, shown is a borehole inspection and testing device 10 in a borehole BH. Borehole BH has a side wall SW extending between a top opening O in a ground layer G and a bottom extent BE. Bottom extent BE defines the borehole bottom referenced above and includes both a debris layer DL and a bearing layer BL. As can be appreciated, both layers in the bottom extent can be much thicker than shown wherein this drawing is only intended to be a general representation of these layers for the purpose of describing the invention of this application. Yet further, the bearing layer can extend essentially indefinitely into the ground. As discussed more above, due to its loose conditions, the debris layer has much less load bearing capacity and contributes to undesirable excessive settlement of the supported structure, wherein it is desired to minimize this layer and remove or eliminate as much debris as possible. Conversely, however, the bearing layer has a much greater bearing capacity; however, there are still many factors that impact the bearing capacity of the bearing layer. Accordingly, even though it is known that the bearing capacity of the bearing layer is greater than that of the debris layer, the exact bearing capacity is not known and cannot be determined by prior art systems.

FIG. 3 further shows inspection and testing device 10 in borehole BH. Device 10 includes a downhole testing head unit or head assembly 12 along with one or more surface control and/or display unit(s) 14 that can be in direct communication with testing unit 12 by way of one or more communication lines that will be discussed more below. Yet further, control and/or display unit 14 could be an integral part of the overall device which is lowered into the borehole as part of the entire system, preprogrammed to perform the required testing, and guided by electronic sensors. Testing unit 12 includes a head plate or assembly 16 having a top 20 and a bottom 22. Plate 16 further includes sides 30-33 (33 not shown). However, the configuration shown in these drawings is not intended to limit the invention of this application wherein plate 16 can be a wide range of shapes and sizes; including a device having a cylindrical configuration. In one embodiment, plate 16 is about 18 inches in diameter and would be operated to take several readings around the borehole bottom for larger boreholes.

Extending from top side 20 is a mounting arrangement 40 that is shaped to receive a Kelly bar KB or drillstem. Mounting arrangement 40 includes a locking bar 42 to lock unit 12 relative to the bar KB and maintain the engagement between the bar and the device. Plate or assembly 16 can include one or more holes or openings 46 that can allow unit 12 to more freely descend through standing water in the borehole. However, it must be understood that the invention of this application is not to be limited to the support structures shown and described in this application wherein any type of support structure could be used without detracting from the invention of this application including, but is not limited to, round drill stems, with or without a Kelly bar, and/or dedicated support structures.

Unit 12 can include one or more force sensors, shown in this embodiment are two force sensors 50 and 52 extending out of bottom 22. Force sensors 50 and 52 can include any mechanism or system known in the art or the sensor art to determine an applied load. This can include, but is not limited to, strain sensors or gauges, pressure sensors or gauges, such as gauges 54 and 56, respectively, for sensors 50 and 52. These sensors are configured to measure, force or strain on the sensors that can be used to determine layer depth locations, bearing capacity of the debris layer, the thickness of the debris layer, depth location of the bearing layer and/or the bearing capacity of the bearing layer, which will be disclosed more below. While sensors, such as sensors 50 and 52, are shown and described as "cone sensors," these sensors can have a wide range of configurations without detracting from the invention of this application including, but not limited to, cone shapes, conical shapes, semi-conical shapes, flat bottomed shapes, spherical bottom shapes and others. In addition, these various shapes can have different cross-sectional sizes and/or configurations including different lengths without detracting from the invention of this application.

Unit 12 can further include one or more displacement sensors, such as the two sensors 60 and 62 shown, which will also be discussed more below. As will be discussed more below, the displacement sensors can work in combination with the force sensors to measure the physical characteristics of the borehole bottom. In this set of embodiments, sensors 60 and 62 are configured to move relative to plate 16 through openings 64-65, respectively. Unit 12 and/or sensors 60 and 62 can include a displacement sensor that can measure the movement of sensors 60 and 62 relative to head unit 12 and/or any other components of the system. Further, sensors 60 and 62 are biased downwardly and can be biased by any mechanical system known in the art. The biasing can include, but is not limited to weights 66, springs (not shown), fluids and the like for the biasing of these sensors downwardly. In order to help prevent sensors 60 and 62 from penetrating the debris layer, these sensors can include bottom plate units 68 and 69, respectively.

In operation, head unit 12 and/or system 10 can be lowered into borehole BH. The unit and/or system can be lowered by way of any system or device known in the art including, but not limited to, the borehole drilling equipment by way of Kelley bar KB and/or a dedicated lifting device, which will be discussed more below. Further, the lowering of the system can be monitored by a depth measuring system 63. Depth measuring system 63 can be any depth measuring system known in the art to measure downward displacement. The system can then be lowered until a reaction force is measured on the one or more of the sensors. This can be displacement of one or more of the displacement sensors and/or a force reading on one or more of the force sensors of the system. The force sensors are configured to relatively easily penetrate through the debris layer, the displacement sensors are configured to rest on top of the debris layer. Thus, the force sensor will penetrate the debris layer and the displacement sensors will not. In one set of embodiments, the displacement of the displacement sensors can be used to measure the depth of the debris layers. Further, the reaction force on the force sensors can be utilized to determine the bearing capacity, or lack thereof, of the debris layer. The downward movement is continued until the force sensors engage the bearing layer. As will be discussed more below, the change in force readings on the force sensors can be used to determine the location of the bearing layer. In this respect, the force reading(s) on the force sensors will change significantly when the force sensors transition into the bearing layer. This, in combination with the displacement sensors, can measure the thickness and/or depth of the debris layer. In accordance with another embodiment, the force sensors alone can measure debris layer depth by monitoring force readings in combination depth measuring system 63.

In one embodiment, the one or more force sensors can be three or more force sensors. The penetration force can be measured in any way including, but not limited to, electronically, hydraulically and/or pneumatically, which includes, but is not limited to, by strain sensors. The hydraulic or pneumatic pressure can be configured to be sensed at the surface which would improve the ruggedness of the device, but could be sensed anywhere along the hydraulic supply lines, including within the borehole at or near plate 16. Semiconductor strain gages can also be used, providing reliable strain measurements even if the strains are small (allowing for large range of load measurements). Calibrated force sensors could also be used and/or one or more sensors having different configurations could be used. For example, one set of force sensors could be configured to measure the lower forces of the debris layer while another set could be configured to measure the larger loads of the bearing layer. For the displacement sensors and/or depth measurement system, the displacement could be measured by any way known in the art including, but not limited to, hydraulically, LVDT, potentiometer, ultrasonic, radar, laser, RF, wirelessly by either sonic waves or laser technology relative to the top of the borehole or otherwise. The displacement could be measured as the distance between the plate 16 and bottom plates 68 and 69. Sensors 60 and 62 also can be weighted and/or spring loaded wherein, in a preferred embodiment, they are lightly weighted with weights 66 so as to keep the bottom plates in contact with the top of the debris of debris layer DL, but allow resistance, but free movement.

All load measurements (from direct force measurements, hydraulic pressure, pneumatic pressure and/or strain measurements converted to force) could be displayed against this displacement measurement, in real time. Ideally one would pair one load transducer display with a nearby displacement measurement, although the average load and average displacement would also provide a meaningful result. Individual measurements would provide information about the variability of the bottom and/or bottom surface angles. However, the measurements could be easily repeated at various locations around the bottom of the sometimes very large shaft diameter. Yet further, other sensors, such as one or more accelerometers or tilt sensors (not shown) could be utilized to measure surface angles.

These sensors, and others, can be in communication with workers on the surface operating the equipment by one or more communication lines between head unit 12 and control unit 14. These communication lines can utilize any technology known in the art and new technology to communicate data to the surface. This can include, but is not limited to, hydraulic lines, electrical lines, data lines, fiber optics, coax cable, USB, HDMI, Ethernet, CAT 5, CAT 5e, CAT 6, serial cables, parallel cables, wireless technology, radio frequency communication, sonar, and/or optical communication. The control system can alternatively be located at or near plate/assembly 16 and operate from within the borehole. As can be appreciated, by utilizing a communication system to transfer data to the surface allows the data to be quickly accessed by the workers and prevents the need to retrieve the system from the borehole after each reading. Yet further, the control unit 14 can be a computing system and can be coupled to one or more other computing systems that can be used, for example, to control the testing operations, track data, store data, analyze data and/or transmit data including transmissions to off-site remote locations. Yet further, the computing system can include one or more local computing systems at the jobsite or borehole, including within the borehole, such as unit 14, and one or more computing systems that are off site (not shown), but in communication with unit 14. Even yet further, a wide range of operating systems can be used by workers and/or engineers and these systems can be any system known in the art including, local systems, network systems, application software, cloud based system and/or a blend of these systems. By using systems, such as a cloud based system, many individuals can monitor and/or evaluate data in real time. As a result, engineers can monitor more than one testing operation and can do so either at the jobsite and/or at a remote location. Further, the operation unit can be separate from the data collection unit. Yet further, this can allow the contractor to operate the system while allowing an engineer to monitor the operation at any desired location. In the embodiment shown in FIGS. 3, communication lines 70-73 are used to transfer signals and/or data to unit 14. These lines can be the same lines and/or different lines. For example, one or more lines could be electrical lines to transfer data and other lines could be hydraulic lines to transfer pressure and/or pulses. In the embodiments shown in these figures, line 70 is joined between sensor 50 and control unit 14, line 71 is joined between sensor 60 and control unit 14, line 72 is joined between sensor 52 and control unit 14, and line 73 is joined between sensor 62 and control unit 14. Unit 14 can be any computing system known in the art and can include a data storage and/or a display device, potentially monitored remotely will allow the engineer to make an immediate decision as any necessary cleaning or additional drilling necessary to completing the shaft. Unit 14 can also serve as a data collector to supplement field installation logs and for production documentation.

Figure 3A:
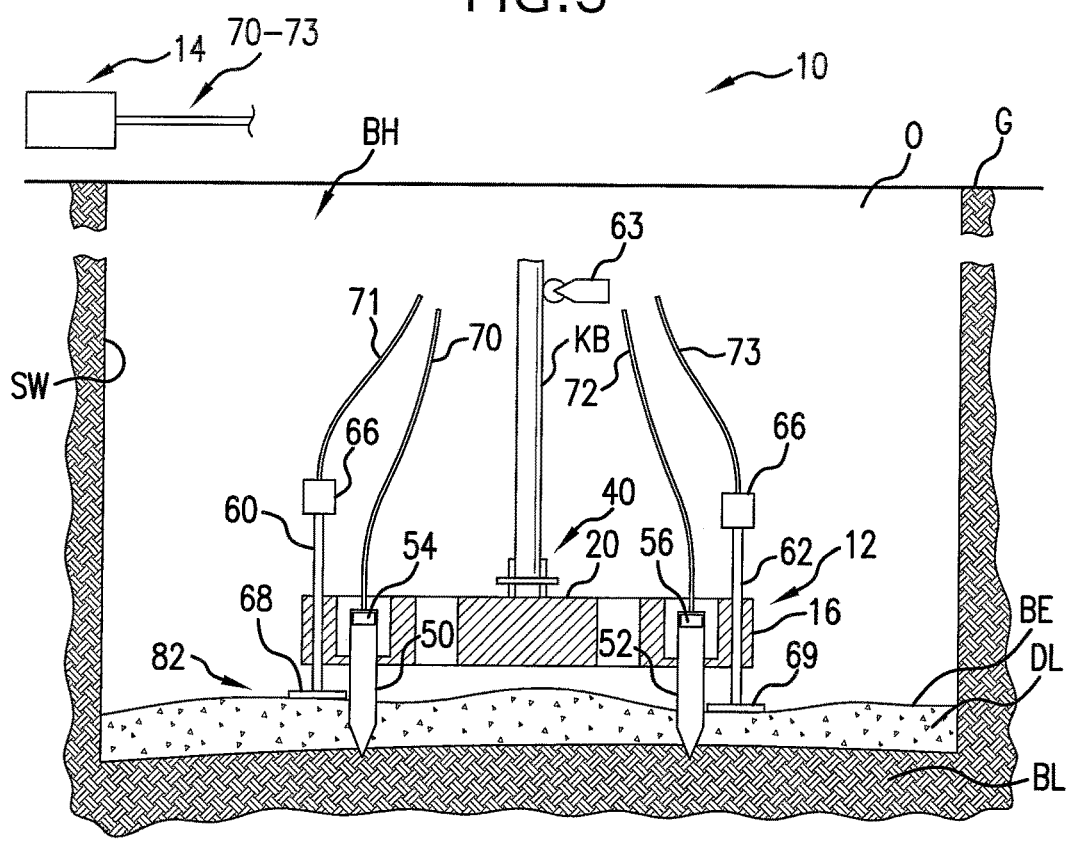
FIG. 3A is an elevational view taken at the bottom of a borehole and which shows an embodiment of the invention of this application at the bottom of the borehole as sensors begin to engage the bearing layer.
Figure 3B:
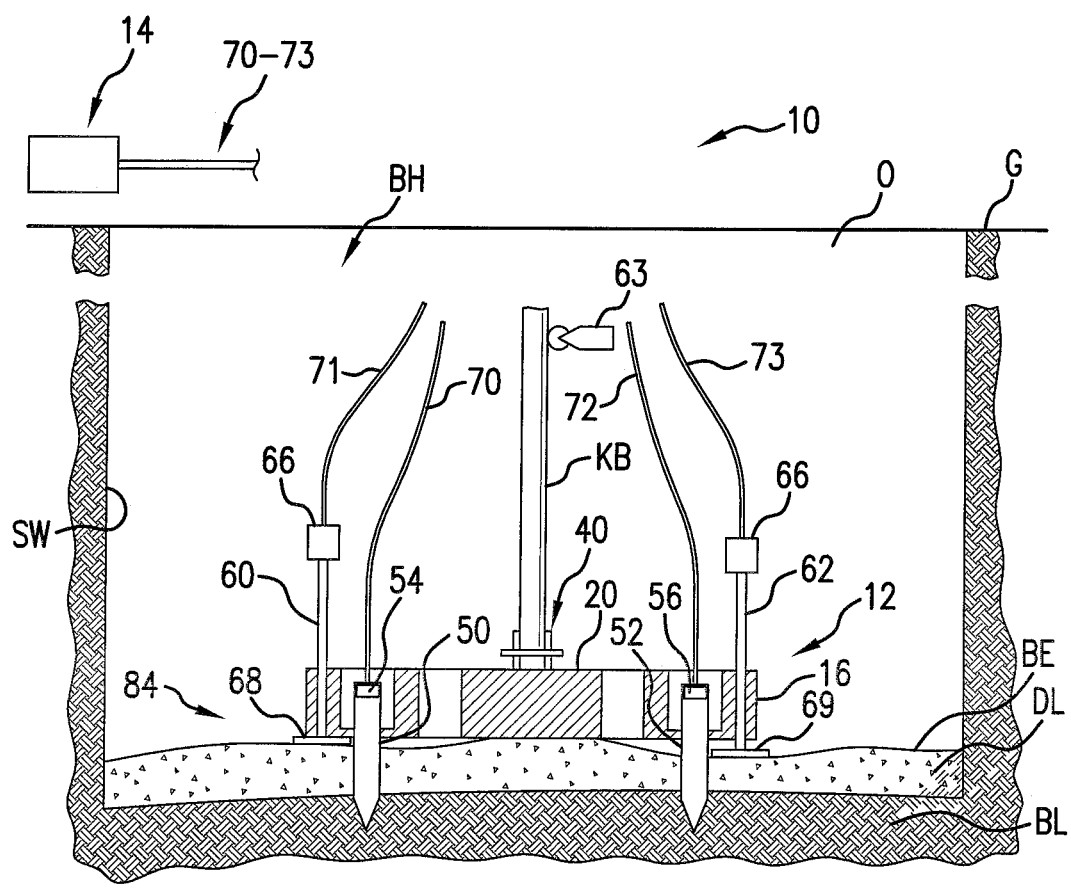
FIG. 3B is an elevational view taken at the bottom of a borehole and which shows an embodiment of the invention of this application at the bottom of the borehole as sensors fully engage the bearing layer.

In operation, the drillstem or Kelly bar KB can be used to lower unit 12 into borehole BH and to direct the device into engagement with bottom extent BE. Further, Kelly bar KB, can be used to provide the application load to unit 12 and/or can be used to determine head depth. As the device approaches bottom BE, sensors 60 and 62 can be used to detect an engagement with debris layer DL, as is shown in FIG. 3. This detection can be used to mark the location or depth of the top surface of the debris layer and, therefore, provide a reference for the measurement of the thickness of any debris. At the same time it can also create a base or reference point for the remaining data readings. As the device is urged further downwardly, as is shown in FIG. 3A, sensors 60 and 62 will remain on top of the debris layer while sensors 50 and 52 will penetrate the debris layer. As a result, in at least one embodiment, sensors 60 and 62 can measure displacement while sensors 50 and 52 measure the force or load applied in any layer on the bottom of the borehole. This can be used to create a displacement and force relationship and/or load versus displacement curves and the basis for the calculation of the soil's elastic modulus. Bottom plates 68 and 69 help maintain sensors 60 and 62 on the top of the debris layer and further downward movement results in sensors 60 and 62 moving relative to head plate 16 wherein this displacement can be measured. Even though force sensors 50 and 52 are moving through the debris layer, they can still measure the resistance, load, force or strain in this movement to generate a load bearing data curve of force versus displacement for this layer. As unit 12 is moved further into the borehole, as is shown in FIG. 3B, sensors 50 and 52 will e engage bearing layer BL as is shown in FIG. 3B. When this occurs, the load applied to sensors 50 and 52 will markedly increase wherein these sensors can be used to determine when these sensors engage the bearing layer and the bearing location or depth of the bearing layer can be calculated or determined. See FIG. 4. In this respect, the load on these sensors will increase in the bearing layer as they encounter denser materials of increased bearing capacity. Thus, when they encounter the bearing layer, the readings of force and/or strain on sensors 50 and 52 will increase. At this point, the displacement of the sensors 60 and 62 between the set point (FIG. 3) (or initial top of debris layer) and the bearing point (FIG. 3B) can be used to determine the thickness and/or depth of the debris layer. Again, as stated above, while only two sets of two sensors are shown in the figures, more or less sensors could be used without detracting from the invention of this application.

Figure 4:
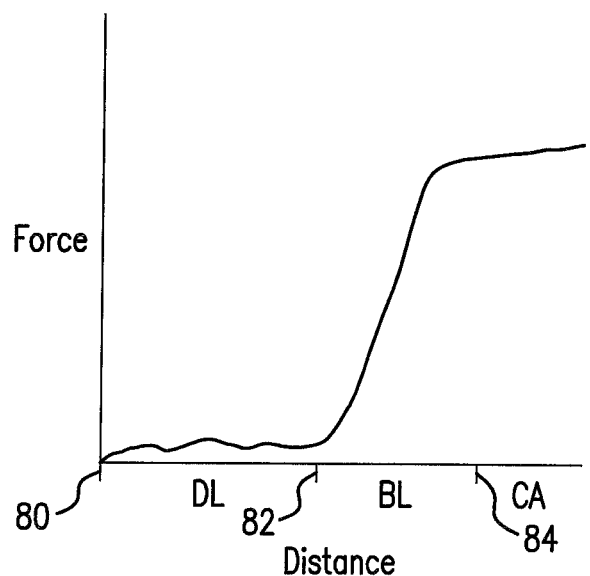
FIG. 4 is a graph showing displacement and force relationship for a sensor of the device of this application.

In greater detail and with special reference to FIG. 4, as the unit 12 is lowered into the borehole, the force on sensors 50 and 52 is zero and remains zero until unit 12 reaches depth 80 as is shown in FIG. 3. Then, continued downward movement will increase the force on force sensors 50 and 52 wherein sensors 50 and 52 can be used, in some embodiments, to determine the position of debris layer DL and/or bearing layer BL. The forces on sensors 50 and 52 remain low as sensors 50 and 52 move through the debris layer, but could fluctuate based on the debris that is on the bottom of the borehole. Continued downward movement will continue to read lower force levels until 12 reaches depth 82 as is shown in FIG. 3A. At this point, the forces on sensors 50 and 52 will begin to rise rapidly as they engage bottom layer BL in view of the greater density of bearing layer BL. Again, reaching this depth, which can be at least in part recorded by sensors 60 and 62, will cause the sharp increase in forces on sensors 50 and 52 and this sharp increase also could be used to determine the depth and/or thickness of the debris layer along with the location of the bearing layer. However, as is discussed above (and will be discussed more below), separate sensing systems could be used for determining the location of the layers. It should be appreciated that sensors 50 and 52 should be sufficiently long to penetrate into the bearing layer BL prior to the unit 12 bottom reaching the top of the debris layer DL. Then, downward movement of unit 12 can be continued until the forces stabilize, shown as depth 84 in FIG. 3B. When this occurs, the bearing capacity of the bearing layer can be determined. Thus, system 10 can accurately measure the depth location of the top of the debris layer, the thickness of the debris layer, the bearing capacity of the debris layer, the depth location of the top of the bearing layer and the capacity of the bearing layer. In accordance with one set of embodiments, sensors 60 and 62 can be configured to determine both the top extent of the debris layer and the thickness of the debris layer while force sensors 50 and 52 measure the bearing capacity of the debris layer, the bearing capacity of the bearing layer and the top extent of the bearing layer.

Yet further, the measurements can be made at multiple locations around the bottom of the borehole with simple lateral repositioning of unit 12 and without removing unit 12 from the borehole. In addition, these measurements can be analyzed by any operator either at the jobsite or at a remote location. Further yet, this data can be analyzed and stored for operational uses, quality assurance uses and other uses. These movements can be guided by electronic sensors such as gyros, GPS, etc. Additionally, the control system may be part of the mechanical system and operate automatically from within the borehole. This automatic system could include sensors to guide the positioning and movement within the borehole as well as automatically perform the desired test and store all relevant data for later analysis.

With reference to FIGS. 5-14, examples of yet other embodiments are shown. In these figures, like reference numbers are utilized for similar structures in the interest of brevity and system already discussed above are not discussed in reference to these figures in the interest of brevity. These figures are merely intended to show examples are alternative embodiments and can include any feature, function, system, structure and/or component discussed above. Thus, this is not to be interpreted to limit these embodiments.

Figure 5:
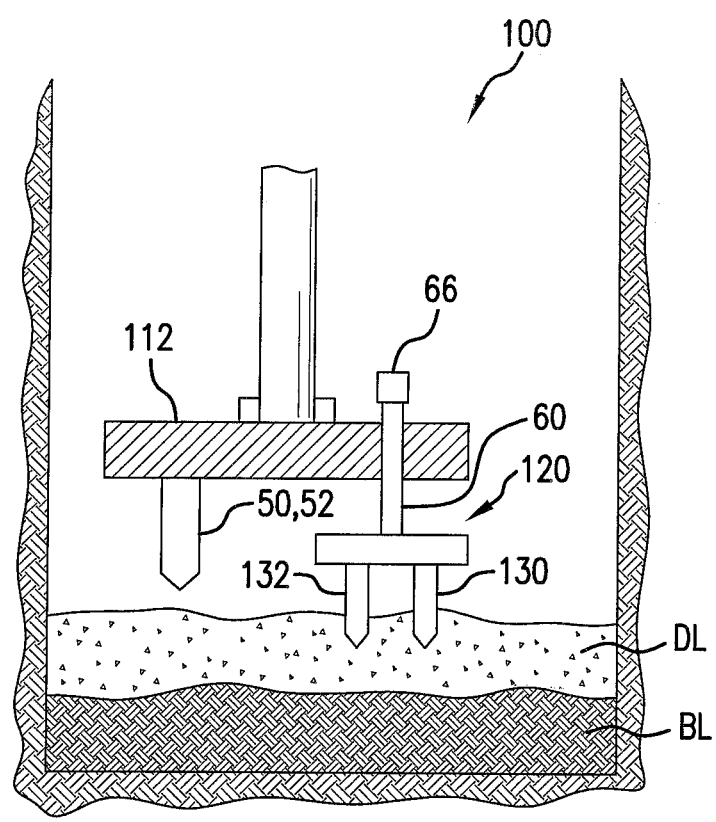
FIG. 5 is an elevational view taken at the bottom of a borehole and which shows another embodiment of the invention of this application.

FIG. 5 shows a head unit 100 that includes a two piece plate design. This design includes a head plate/assembly 112 and secondary plate or assembly 120. In this embodiment, secondary plate 120 can be configured to both determine the location of the debris and bearing layers and also determine capacities. Secondary plate 120 is configured to move relative to plate 112 and this relative movement can be tracked by sensor 60 such it can also be used to measure the location of the debris layer and the depth and/or thickness of the debris layer. In addition, plate 120 can include sensors 130 and 132 to help determine the consistency of the debris layer or confirm the readings of sensors 50, 52 (only one shown in this figure) that can operate as described above.

Figure 6:
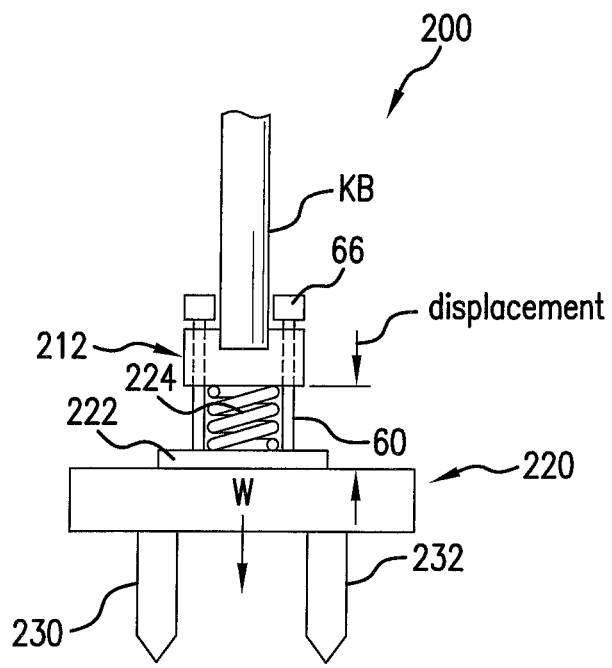
FIG. 6 is an elevational view which shows yet another embodiment of the invention of this application.

FIG. 6 shows a head unit 200 that includes a different two piece design. This design includes a head plate/assembly 212 and a secondary plate or assembly 220. In this embodiment, secondary plate 220 is configured to both determine the depth location of the layers and also determine capacities. Yet further, this embodiment, and the other embodiments of this application, can be configured such that the system operates by way of its own weight W. Weight W can be produced by any mechanism including, but not limited to, the weight of the head assembly itself, a secondary weight 222 and/or a secondary spring arrangement 224. Secondary plate 220 can be configured to move relative to plate 212 such that it can operate based on its own weight W and wherein it can also be used to measure the location of the debris layer and the depth and/or thickness of the debris layer. As a result, the system could be lowered by the Kelly Bar or could be lowered by any other means, including but not limited to, a cable connected to a crane, crane-like system or pulley system. In one embodiment, weight W is greater than approximately 50 pounds. In another embodiment, the weight is between approximately 100 and 300 pounds. In a preferred format weight W is approximately 150 pounds. However, it should be noted that while these weights (and ranges of weights) may be preferred, the invention of this application is not limited to these weights and/or ranges. Thus, when the probes penetrate, and in view of the known weight W, this data can be used to determine bearing capacity, or at least to determine the depth and/or thickness of the debris layer. In addition, plate 220 includes one or more sensors 230 and 232 to determine both the consistency of the debris layer and the bearing capacities as discussed above in greater detail in view of the know weight W. The movement of secondary plate 220 relative to primary plate 212 can be tracked for layer location and/or thickness. In addition, further downward movement of the unit forces the plates 212 and 220 together (not shown) to allow additional readings, such as the use of sensors 230 and 232 to determine the bearing capacity of the bearing layer.

Figure 7:
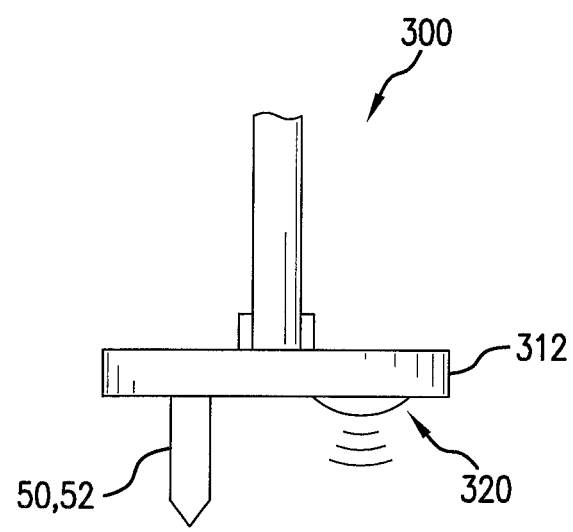
FIG. 7 is an elevational view which shows a further embodiment of the invention of this application.

FIG. 7 shows a head unit 300 that includes a single plate design. This design includes a head plate/assembly 312 that includes one or more sensors 50, 52 that can operate as described above. However, in this embodiment, location and/or depth can be determined by one or more electronic sensors in sensor unit 320. Sensor unit 320 can work in connection with other systems described in this invention (including, but not limited to sensors 60/62) and can be used to help determine the location of the bottom of the borehole. Sensor unit 320 can be any sensor capable of detecting an object, surface or plane including, but not limited to sonar, radar, lasers and/or optical technologies. Yet further, these sensors alone, or along with others could be utilized to determine if the borehole is vertical. Even yet further, depth could be measured using a sensor detecting the pressure of the fluid, and small changes of fluid pressure then converted to relative displacements. Yet even further, sensor unit 320 could include multiple sensors to help account for differences in fluid densities at different depths for boreholes that are filled with a borehole fluid to help maintain the integrity of the borehole between drilling and filling.

Figure 8:
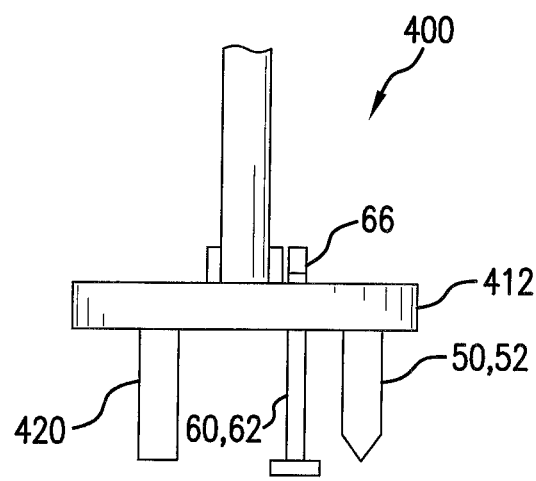
FIG. 8 is an elevational view which shows yet a further embodiment of the invention of this application.

FIG. 8 shows a head unit 400 that is being used to illustrate that the probes or sensors can include different configurations. In this respect, unit 400 includes a head plate 412 with both probes 50, 52 described in greater detail above and one or more flat bottomed probe(s) 420. This embodiment can include other sensor configuration described in this application and can further improve the measuring accuracies of the device. More particularly, one or more sensors of this application can be configured for a single function wherein multiple sensors are used for all needed functions. In this embodiment, probes 420 can be configured to only determine the bearing capacities of the layers in that the flat bottom will reduce penetration and can make it easier to calculate bearing forces. Unit 400 can further include one or more displacement sensors, such as sensors 60 and 62, described above in greater detail.

Figure 9:
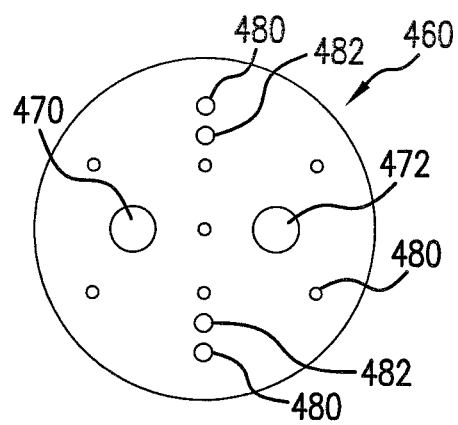
FIG. 9 is a bottom view of a plate that can be used with embodiments of this application.

With reference to FIG. 9, shown is a displacement plate 460 that can be used to replace bottom plate units 68 and 69 of sensors 60 and 62, respectively of any embodiment of this application. Replacing plate units 68 and 69 with one or more movement plates 460 can increase the surface area for the base of the displacement sensors to help prevent the penetration of sensors into the debris layer. This can provide for more accurate depth measurement, or at least can be used to average the depth measurement of the thickness of the debris layer. In that plate 460 moves with the depth sensors, the plate can include openings 470 and 472 to allow sensors 50 and 52 to pass therethrough so that plate 460 can move relative to sensors 50 and 52. Plate 460, along with plate units 68/69 described above, can include one or more holes or openings 480 of any size to help lower the plate and the overall unit into standing water and/or borehole fluids in the borehole. Plate 460 can include one or more attachment arrangements 482 to secure plate 460 relative to the displacement sensors, such as displacement sensors 60 and 62. However, while two attachment locations are shown, this is not required.

Figure 10:
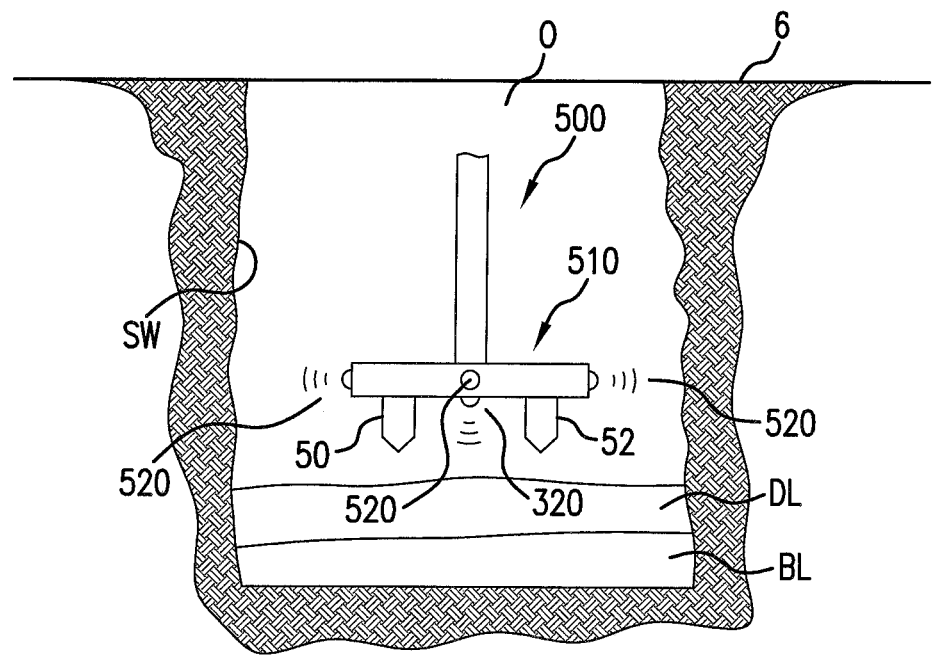
FIG. 10 is an elevational view of yet another embodiment of this application configured to also measure the side walls before the pile is poured.
Figure 11:
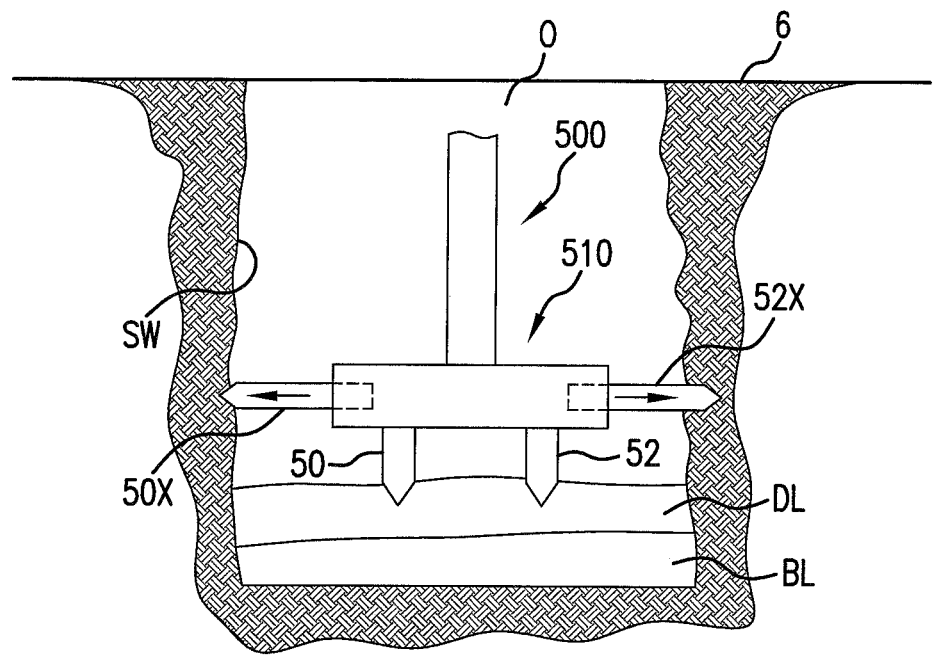
FIG. 11 shows an elevational view of yet a further embodiment of this application including a lateral bearing measurement feature to produce a load versus displacement curve for the borehole side wall.

With reference to FIGS. 10 and 11, the devices and systems of this application can further include a wide range of other sensors. These other sensor(s) can be configured to measure the layers discussed above and/or other characteristics of the borehole. As is shown in FIG. 10, a borehole measuring device 500 can include a plate unit assembly 510 that also includes one or more side sensor(s) 520. Essentially, side sensors can be spaced circumferentially about the plate to measure the condition of side wall SW and/or the location of the side wall. The number of side sensors can be based on the "resolution" that is desired. In this respect, the more sensors circumferentially positioned about plate 510 can increase the amount of side wall that can be accurately measured. Yet further, any number of sensor(s) 520 could be positioned centrally and could be configured to scan 360 degrees and/or rotate 360 degrees to scan side wall SW. In one embodiment, there are between about 6 and 8 sensors 520 spaced about the plate, preferably equidistantly about the central axis of the plate. Again these additional sensors can be used in combination with any embodiment of this application and, for example, device 500 can include one or more laterally facing pressure sensors 50, 52 that can operate as described above. As discussed above, sensors 520 could include multiple sensors at each location (or at least at one of the locations) to help account for, or calculate for, differences in fluid densities at different depths for boreholes that are filled with a borehole fluid to help maintain the integrity of the borehole between drilling and filling. While all of the sensors could have this feature, one embodiment includes at least one sensor with the dual sensor feature that can be used to determine the fluid density and the remaining sensor can utilize this data.

With special reference to FIG. 11, plate or unit 510 discussed above can also include one or more different types of sensors that are laterally positioned including, but not limited to, laterally facing sensors 50x and 52x that are actuatable laterally so that they can be forced either against or into the side wall to determine one or more physical characteristics of the side wall(s). These sensors can be pushed against the side wall to determine location and/or bearing capacity. Further, this embodiment, and others can utilize downward electronic sensor(s) 320, discussed above, for depth measurement. As a result, sensors 320 and 520 discussed above in relation to FIG. 10 can be used to measure the shape, condition and locations of the layers and side walls, while sensors 50 and 52 can measure bearing capacities of the bottom layers and sensors 50x and 52x can measure bearing capacities of the side wall. As with sensors 320, sensors 520 can be any sensors configured to determine surface geometries including, but not limited to sonar, radar, lasers and/or optical technologies.

Yet further, the force sensors 50, 52, 50x and/or 52x could be replaced by a plate which measures an average soil resistance over a wider area. Further, the device can also record a dynamic load test at varying impact speeds, by using an impact weight against a bearing plate on the drillstem. Yet further, the units of this application can include an inclinometer, accelerometer(s), and/or tilt meter to determine the angle or pitch of the bottom of the borehole. This can include, but is not limited to, the use of sensors 50, 52, 60 and/or 62 operated independently of one another to determine displacement or pressure differences that can be used to calculate pitch. As mentioned above, the number of sensors can depend on many factors including desired accuracies, costs and the use of the sensors wherein determination of characteristics, such as pitch, could necessitate more sensors. Accordingly, while it may be preferred that three sensors be used, it is not required. Yet further, the system can utilize other technologies, such as GPS, that can be used to locate and mark which hole in the construction site is being tested. This data can be utilized to organize test data for future use or review. The GPS can be any position locating system such as satellite based positioning systems and jobsite based location systems. These other sensors, such as the side sensors noted above, can also be used to determine the position of the unit within the boreholes, such as whether the device is centered within the one borehole. Yet further, gyroscopic and/or geomagnetic based systems can be utilized to track movement of the systems within the borehole.

Yet further, as is noted above, the borehole inspection and testing devices of this application could be joined to a wide range of support structures and these even include a dedicated support system wherein the inspection and testing device could be left in place for permanent pressure monitoring, which is particularly useful in conjunction with hydraulic pressure measurement systems which have the ability of accurately sensing the pressures applied by a structure to the foundation. In addition, the inspection and testing devices of this application could be used without a Kelly bar or drill stems without detracting from the invention of this application. Yet further, the inspection and testing device can also be configured to extract samples of the debris/bearing layer. This can be done with a wide range of systems including, but not limited to, one or more hollow penetrometers (not shown).

Figure 12:
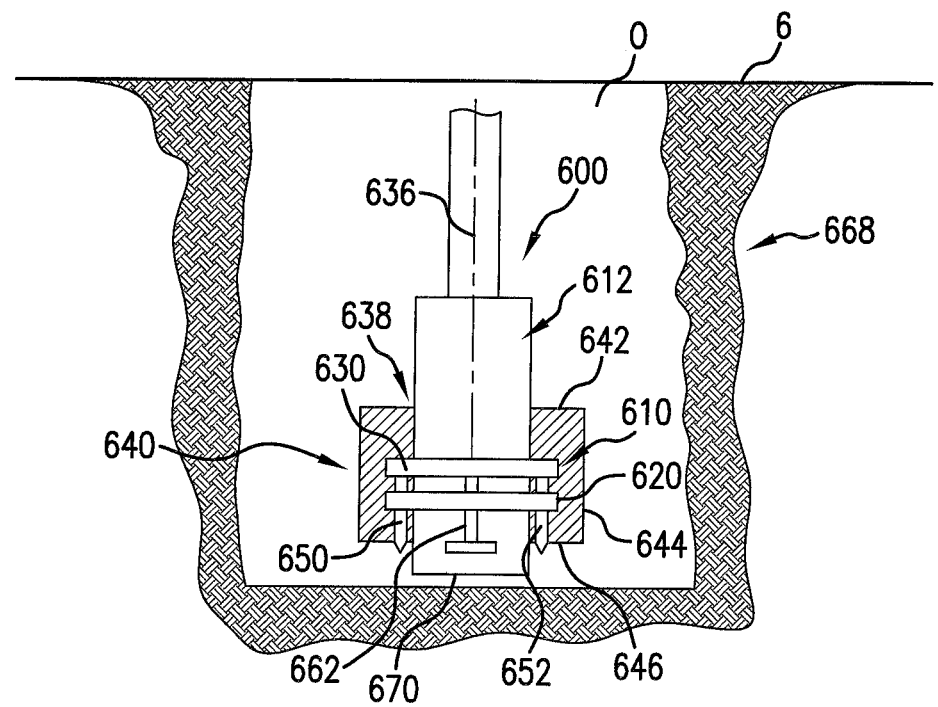
FIG. 12 shows an elevational view, partially sectioned, of yet a further set of embodiments of this application including a borehole inspecting and testing device joined relative to a cleanout bucket shown in a retracted condition.
Figure 13:
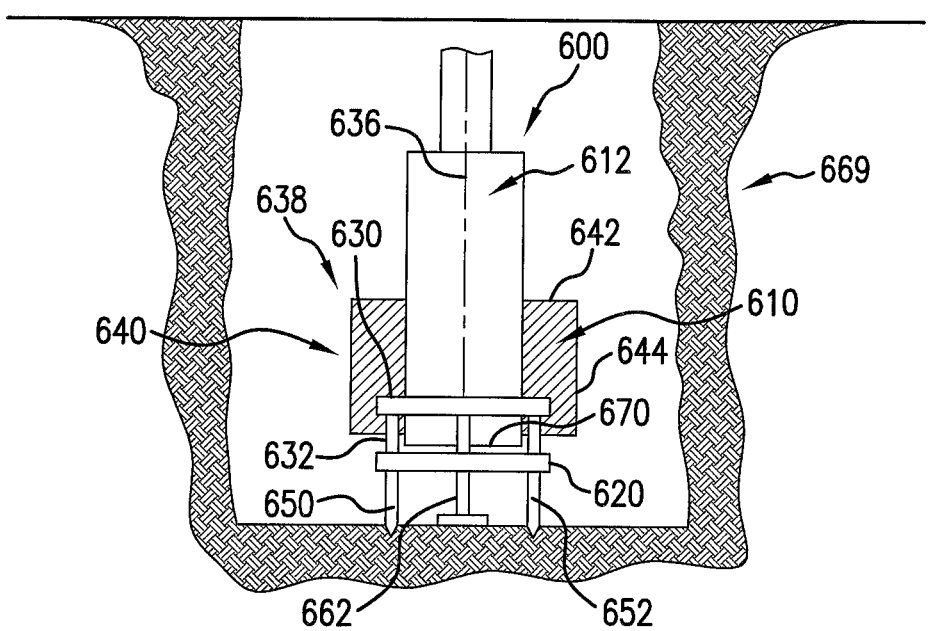
FIG. 13 shows an elevational view, partially sectioned, of the borehole inspecting and testing device shown in FIG. 12 in a measurement condition.
Figure 14:
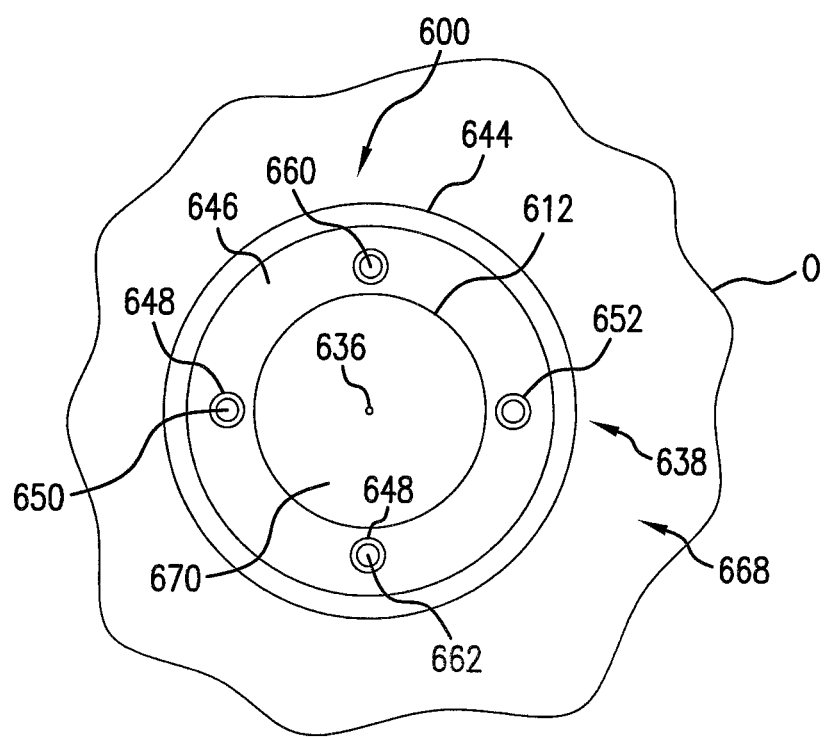
FIG. 14 shows a bottom view of the borehole inspecting and testing device shown in FIG. 12.

With reference to FIGS. 12-14, shown is a borehole inspection and testing device 600 having a head unit 610 that is joined relative to a cleanout bucket 612. This particular embodiment allows a single device to both remove debris from the bottom of the borehole and test the layers at bottom of the borehole as are discussed in greater detail above. As can be appreciated, this can further streamline the process of preparing and testing the borehole bottom by eliminating change over times between the use of the cleanout bucket and the inspection and testing devices of this application.

In greater detail, system 600 can include an annular extension ring 620 that can move relative to cleanout bucket 612. Ring 620 can include one or more sensor similar to one or more of the sensors discussed in greater detail above with respect to any of the disclosed embodiments. In the particular example shown, head unit 610 can include one or more force sensors 650 and 652 that can be similar to force sensors 50 and 52 discussed in greater detail above and/or one or more displacement sensors 660 and 662 that can be similar to displacement sensors 60 and 62 also discussed in greater detail above. While this example includes a four sensor arrangement, any number of sensors could be used without detracting from the invention of this application. Yet further, even side wall sensors could be utilized in this embodiment. And, the side wall sensors could be separate from extension ring 620.

Head unit 610 can further include a support ring 630 that can be joined to extension ring 620 by one or more actuation devices 632 that allow ring 620 and sensors 650, 652, 660, 662 to move relative to support ring 630 and bucket 612 along axis 636. Actuation devices 632 can be any actuation devices including, but not limited to, hydraulic and/or pneumatic cylinders. System 600 can further include a shielding apparatus 638 to protect head unit 610. This is particularly important when device 600 is lowered into borehole O and during the operation of the cleanout bucket. The shielding apparatus can include an upper shield 640 that can be formed by a top wall 642 and a side wall 644. In the embodiment shown, the side wall is a single cylindrical side wall, but this is not required. In addition, shielding apparatus can further include a bottom protective ring 646. Bottom protection ring 646 can be joined to side wall 644 or to the head unit. Further, ring 646 can include ring openings 648 that allow the sensors to retract into shielding apparatus 638 when the testing unit is not in use there by further protecting the equipment of the testing unit.

In operation, head unit can moves between a retracted position 668 as is shown in FIG. 12, wherein head unit 610 and the sensors are spaced from a working end 670 of bucket 612. This allows bucket 612 to be utilized to remove debris from the borehole without damaging the head unit.

FIG. 13 shows system 600 in an extended position 669 wherein system 600 can measure the bottom layers of the boreholes as is discussed in greater detail above. Further, actuators 632 can be utilized to produce the downward force and/or movement of the sensors for the testing of the borehole layers.

Referring now to the FIGS. 15-24, a borehole inspection device or system 710 is shown that includes a downhole testing head unit or head assembly, unit or arrangement 730 that can be lowered into borehole BH wherein the borehole has one or more sidewalls SW extending between top opening O in ground layer G and a bottom extent BE. Bottom extent BE defines the borehole bottom. System 710 can further include one or more surface control and/or display unit(s) 740 that can be in direct communication with head unit 730, but this is not required, which will be discussed more below.

Head unit 730 can be any configuration without detracting from the invention of this application. As is shown, Head unit 730 includes a top 731 and an opposite bottom 732. Head unit 730 further includes one or more side 733 that extend radially outwardly from a head unit axis 734. Head unit 730 further includes an outer layer or shell 735 and one or more watertight internal regions 736, which will be discussed more below. As will be discussed more below, head unit 730 can be positioned within the borehole such that head unit axis 734 is plumb wherein system 710 can further detect the verticality of the borehole to determine whether the borehole is plumb within the ground surface along its length.

In one set of embodiments, head unit 730 is in direct communication with surface unit(s) 740 by way of one or more wireless communication systems 748. This direct connection can be in real time and/or intermittent as is desired and/or required. In these embodiments, wireless communication systems 748 is a wireless communication system that includes a first wireless antenna (internal and/or external) 750 connected to head unit 730 and a second wireless antenna (internal and/or external) 752 connected to surface control unit 740. These antennas can utilize any technology known in the art and are preferably transceivers that both send and receive data. Further, the antenna technology can depend on the whether the Borehole is filled with air or liquid L (such as a slurry). In one set of embodiments, control unit 740 can include an antenna 752*a* that is at least partially submerged in liquid L that is within the borehole. Yet further, the wireless technology can also utilize the central opening in the Kelly Bar to transmit data in boreholes that are filled with liquid L to allow for transmission through air instead of the borehole liquids. As can be appreciated, transmission through slurries eliminates many wireless technologies wherein use of the internal cavity of the Kelly Bar could allow for their use, such as use of optical wireless technologies. Wireless communication system 748 allows head unit or assembly 730 to communicate with surface control unit 740 during a data collection phase and/or a data transmission phase without the need for wires thereby further simplifying the setup of system 710 simplifying the operation of the system, but this is not required. As can be appreciated, wired communication during data collection can involve long lengths of communication wires or lines that must be managed at the jobsite. Further, wires on the jobsite can be damaged, which can create downtime. Yet further surface control and/or display unit(s) 740 can be an on-site unit that is located at or near the bore hole, at any location onsite, or can be an off-site unit located at a remote location wherein the borehole work for one or more boreholes is done by engineers that are offsite. Yet further, the system can further include a separate offsite control and/or display unit(s) 741 that works with on site surface control and/or display unit(s) 740 or directly with head unit 730. Any system of communication known in the art can be used to communicate to, or from, the off-site location.

Head unit 730 can further include a self contained power supply 756 to provide electrical power to operate an internal measurement system 758 of the head unit, which will be discussed in greater detail below. Power supply 756 can be any power supply known in the art including re-chargeable power systems. Yet further, power supply 756 can include the use of interchangeable and/or rechargeable battery packs that allow for a longer operational life of the battery system. In that rechargeable battery systems are generally known, these will not be discussed in greater detail in the interest of brevity.

Surface units 740 and/or 741 can be any control unit configured to operate a system and/or collect data including, but not limited to, a computer system, a laptop, a tablet, a smart phone, a hand held system, a wrist mounted system and/or the like. In that these types of systems are known in the art, details are not included in this application in the interest of brevity.

In different embodiments of this application, differing portions of system can be within downhole head unit 730 without detracting from the invention of this application. The same is true concerning units 740 and/or 741. In this respect, some or all of the operating system for system 710 could be an integral part of internal measurement system 758 of head unit 730 wherein unit 740 could have more of a display, data transmission and/or data storage function. In other embodiments, surface unit 740 is a display and control unit wherein head unit 730 operates based on instructions received from surface unit 740. Accordingly, the operating system could be in either device and/or both devices. In any arrangement, the overall device could include one or more preprogrammed operation modes configured to automatically perform one or more desired testing routines and/or guide the system within the borehole. This can include the one or more operational steps for unit 730 during the data collection phase. Further, this preprogramed operation could include guiding the system based on input from one or more of the sensors that will be discussed more below. The wireless communication system can be any wireless system known in the art including, but not limited to high frequency ultrasonic technology. Further, the wireless technology can operate on different frequencies based on the material that it is communicating through. This can include, for example, operation at in the range of about 0.5 to 2 MHz in wet or slurry conditions and in the range of about 10 to 100 KHz in dry conditions. In one set of embodiments, operation is at about 1 MHz in wet or slurry conditions and about 20 to 60 KHz in dry conditions; preferably around 40 KHz. Yet further, the wireless communication system can include one or more liquid sensors 754 to determine whether head unit is in a wet or dry condition, which can be used to automatically or manually switch the system to and from wet or dry modes. Liquid sensor 754 can be a part of internal measurement system 758. In one set of embodiments, sensor 754 could include an ultrasonic sensor and/or use one of the ultrasonic sensors discussed in greater detail below.

Downhole head unit 730 can operate in differing levels of independence without detracting from the invention. In this respect, head unit 730 can operate independently of units 740 and/or 741 when it is in the data collection phase of the testing, but operate with units 740 and/or 741 when in the data transmission phase. In this application, the data collection phase is when head unit 730 is within borehole BH and is testing the borehole. The data collection phase can include a lowering phase wherein head unit 730 is being lowered in the borehole from borehole opening O toward bottom extent BE and/or a raising phase wherein the head unit is being raised in borehole BH from bottom extent BE toward opening O and any subsets thereof. Test data can be taken in either or both of these phases.

Figure 19:
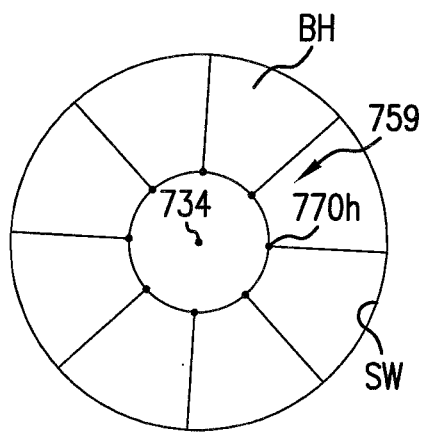
FIG. 19 is an enlarged schematic view of a sensor array in a first orientation.
Figure 20:
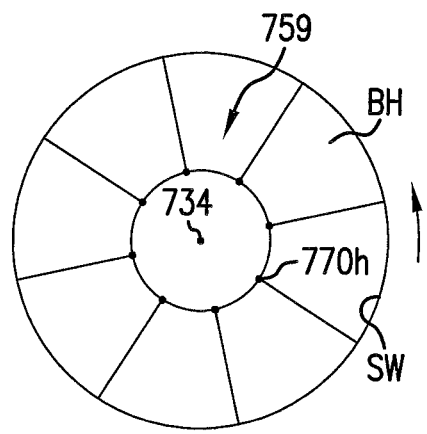
FIG. 20 is an enlarged schematic view of the sensor array shown in FIG. 19 in a second orientation.
Figure 21:
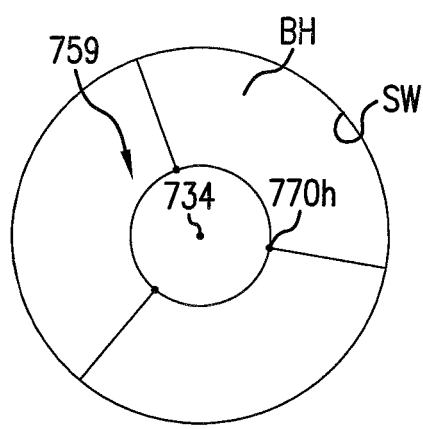
FIG. 21 is an enlarged schematic view of another sensor array.
Figure 22:
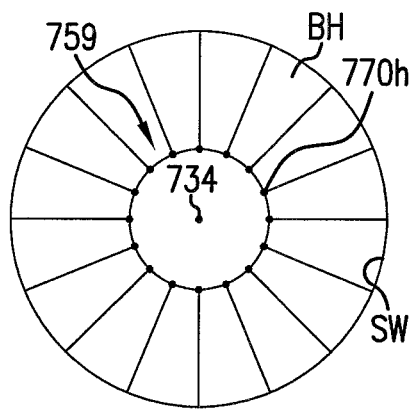
FIG. 22 is an enlarged schematic view of yet another sensor array.

In one set of embodiments, data is obtained based on sensor readings that are taken in the lowering phase from a sensor arrangement 759 that includes test data sensors 770, which will be discussed more below. Then, after head unit reaches a lower stop point LSP, which can be a set point at or above bottom extent BE, head unit 730 and/or sensor arrangement 759 can be rotated about a system axis 734. Once the rotation is completed, data can be taken during the raising phase without rotation. With reference to FIGS. 19 and 20, shown are two orientations of the sensor arrangement 759 of head 730, which will be discussed more below. In this embodiment, the sensor arrangement includes eight test data sensors 770h in 45 degree circumferential increments that can be in a first orientation (FIG. 19) during the lowering phase, and then rotated by 22.5 degrees after head unit 730 reaches lower stop point LSP. Then, during the raising phase, head unit 730 can take data readings in a second orientation (FIG. 20). This doubles the measured angular resolution of a single vertical scan. For the head units that include four horizontal sensors 770h (FIGS. 1 & 10), the head unit 730 could be rotated 45 degrees. Yet further, the data collection phase could include multiple lowering and raising phases ("multiple measuring cycles") with a smaller degree of rotation to produce a higher degree of angular resolution for the overall test data.

Wireless communication and/or operation relating to the independent operation of downhole head unit 730 can be, and is defined as, any form of communication that does not require a direct wired connection between units 740 and/or 741 and head unit 730 and/or sensor arrangement 759 during the data collection phase. In this respect, system 710 includes measurement system 758 that allows the operation of head unit 730 and/or sensor arrangement 759 without a wired connection. This can include, but is not limited to, wireless communication system 748 between downhole head unit 730 and units 740 and/or 741 during the data collection phase, This wireless communication between downhole head unit 30 and units 740 and/or 741 during the data collection phase can be limited to data transmission from downhole head unit 730 only. In another set of embodiments, wireless operation can include head unit 730 that operates independent of units 740 and/or 741 during some or all of the data collection phase and communicates with units 740 and/or 741 during the data transmission phase that can be independent of the data collection phase. In this respect, the data transmission phase of downhole head unit 730 can be limited to after the completion of the data collection phase and this transmission can be by either wired and/or wireless transmission without changing the designation of the system as being a "wireless" communication and/or operating system. This includes wired and/or wireless transmission from the downhole head 730 unit after head 730 is at or near the top of the borehole and/or has been removed from the borehole. But, operations of head 730 while in the borehole during the data collection phase are without wired communication wherein operations are "wireless."

Yet even further, if head unit 730 is a self-contained unit as is defined by this application, unit 730 can operate at least partially independently wherein head unit 730 could even eliminate the need for onsite computing system and/or merely need onsite computing systems to be a conduit to one or more offsite systems. For example, head unit 730 could be configured to transmit directly to an offsite location system 741, such as transmitting directly to a cloud computing location or system during the data collection and/or transmission phases based on a direct connection such as by way of a cellular connection between head unit 730 and a cellular service.

However, as can be appreciated, independent operation can take many forms without detracting from the invention of this application wherein in this application, independent operation means that head unit 730 can perform at least some functions without a wired link to a surface system, such as units 740 and/or 741. There are many degrees of independent operation that include, but are not limited to, a) full independence wherein all operating systems, commands, data storage and the like are part of internal measurement system 758 of head unit 730 wherein unit 730 is a fully functional system by itself. The data collected during the data collection phase is thus completely independent of surface systems, such as units 740 and/or 741. b) partial independence wherein head unit 730 includes independent operations but system 710 includes one or more of the commands, data storage and the like at least partially controlled by units 740 and/or 741. This can include, but not limited to, use of units 740 and/or 741 to program a preferred mode of operation for the data collection phase of head 730, receiving data during the data collection phase, providing at least some of the operating steps and/or controlling one or more synchronization clocks. c) substantial dependence wherein head unit 730 is substantially controlled by units 740 and/or 741 during the data collection phase. Again, while examples have been provided, these examples are not exhaustive wherein differing variations of these operation modes are contemplated with the invention of this application.

Head unit 730 can include a wide range of configuration without detracting from the invention of this application. For discussion only, wherein the following description is not intended to limit the invention of this application, head unit 730 can include a head plate and/or assembly 760 that includes top portion 731, bottom portion 732 and one or more sides 733. Head unit can be round as is shown in the drawings, but this is not required. Head unit 730 further includes one or more sensor arrangements 759 for determining the physical characteristics of the borehole wall, the physical characteristics of the borehole bottom and/or to help in the operation of the system, which will be discuss more below. These sensor arrangement(s) can have a wide range of functions and/or uses and can work in combination with other sensors or autonomously.

The sensor arrangements can include liquid sensor 754 noted above that can work to help the operation of the device. The sensor arrangements further include one or more scanners or sensors 770 for the measurement of the physical characteristics of the borehole. In this respect, sensors 770 are configured to scan, sense or detect the borehole walls, borehole bottom borehole opening and/or the top extent of liquid L to determine the locations of these items relative to head unit 730, sensor arrangement 759 and/or plate 760. In the embodiments shown, these sensors can be oriented as needed to obtain desired data. In this respect, sensors 770*h* are radially outwardly facing sensors relative to head axis 734. In that these sensors are measuring radially outwardly from head unit axis 734, the data obtain from these sensors is described as a radius spacing between axis 734 and a portion of sidewall SW that is located radially outwardly of the particular sensor 770*h*, which will also be described in greater detail below. Head unit 730 can further include sensors 770*t* and/or 770*b* that can be utilized to scan the bottom extent to determine the condition of the surface of bottom extent BE and/or to help determine the location of unit 730 relative to the top and/or bottom of the borehole. Again, this can be used to help make unit 730 a self contained system.

Sensors 770 can utilize a wide range of scanning technology without detracting from the invention of this application. The data produced by the sensors can be used to provide dimensional data on the borehole including, but not limited to, the dimensions of the borehole size as radius, the detection of imperfections in the borehole wall, the shape of the borehole wall, vertical orientation and/or any other dimensional characteristics of the borehole wall. And, multiple sensors can be circumferentially spaced about axis 734 to prevent the need to rotate head 30, and/or assembly 760 and/or improve the resolution of the data obtained. In one set of embodiments, sensors 770 include at least one sonar sender and/or receiver (or transceiver) that can be, or is, directed at the surface to be analyzed. Sensors 770*h* are directed at a portion of sidewall SW. This also can include the use of one or more ultrasonic sensors. This can include, for example, operation in the range of about 0.5 to 2 MHz in wet or slurry conditions and in the range of about 10 to 100 KHz in dry conditions. In one set of embodiments, operation is at about 1 MHz in wet or slurry conditions and about 20 to 60 KHz in dry conditions. No matter what sensor is used, a plurality of sensors in sensor arrangement 759 can together calculate a general three-dimensional shape of the borehole and/or the radius of the borehole along its length between opening O and bottom extent BE, or at least a portion thereof. Depending on the number of horizontal sensors 770*h*, this can be done without the need for rotation between the lowering phase and the raising phase between the top extent of the measurement and lower stop point LSP. At least, it can reduce the number of the measuring cycles needed for a desired resolution. Yet further, head unit 730 and/or system 710 can use different technologies for different environments. In this respect, sensors 770 can include ultrasonic sensors for wet or slurry conditions and/or ultrasonic, laser and/or optical sensors for dry conditions. In addition, the ultrasonic sensors can be configured for use with both wet and dry conditions. In this respect, the ultrasonic sensors can be configured to transmit at different frequencies so that the ultrasonic sensors could be operated at higher frequencies for liquids or slurries and operated at lower frequencies for air. Yet even further, the system can include a sensor arrangement 759 that includes multiple sets of different sensors configurations and/or types wherein one set of sensors can be used for dry conditions and another set of sensors can be used for wet conditions. Moreover, these multiple sets could include a first set that has one or more ultrasonic sensors configured to operate at higher frequencies for liquids or slurries and a second set that has one or more ultrasonic sensors configured to operate at lower frequencies for air.

Sensor 770 of head unit 730 can also include sonar transducers which can scan a portion of sidewall SW of the borehole and/or a portion of bottom BE of the borehole with an ultrasonic signal. Again, multiple sonar sensors can be configured to send in multiple directions to prevent the need to rotate head 730 and/or sensor arrangement 759 during data collection as is defined in this application. In this respect, head unit 730 extends about head unit axis 734 and head 730 can be positioned in borehole BH such that axis 734 is generally coaxial with a borehole axis 776, but this is not required and will likely change as unit 730 is lowered into the borehole. In this respect, sensors 770h face radially outwardly from axis 734 of head unit 730 and measure the spacing between the sensor and sidewall SW. This measurement from multiple sensors 770h can then be used to determine the overall radius of the borehole and the location of head unit 730 relative to the borehole. This can be used to determine if the borehole is vertical, if the borehole changes direction, the radius of the borehole and/or if the borehole has any imperfections in its side wall SW. As can be appreciated, head 730 can be positioned in borehole such that head axis 734 is substantially coaxial with borehole axis 776. Then, as the head is lowered, sensors 770h can detect if borehole axis 776 remains coaxial with head axis 734. If the head is being lowered such that head axis 734 is plumb, this is an indication that the borehole is not plumb. Again, while sensors 770h could be a single sensor, it is preferred that head unit 730 includes a plurality of circumferentially spaced sensors 770h positioned about head unit axis 734 that face radially outwardly from axis 734. In this configuration, head unit 730 does not have to be rotated during the data collection phase, which has been found to increase accuracies and greatly reduce testing times.

Yet further, sensor arrangement 759 and sensors 770, including sensors 770h of sensor arrangement 759, can include a wide range of operating modes and these operating modes can be controlled by internal measurement system 758 and/or sensor arrangement 759. In this respect, system 710 can include a sensor arrangement 759 that operates all sensors 770h simultaneously, which is operation in parallel. In another set of embodiments, the sensors, such as sensors 770h, can operate in sets. For example, all of the even sensors 770h could operate during a first testing period and all of the odd sensors could operate during a second testing period. In yet other embodiments, one type of sensor could operate during a first testing period and other types could operate during a second testing period. This includes the operation of one or special application sensors, such as the depth sensors.

Figure 15:
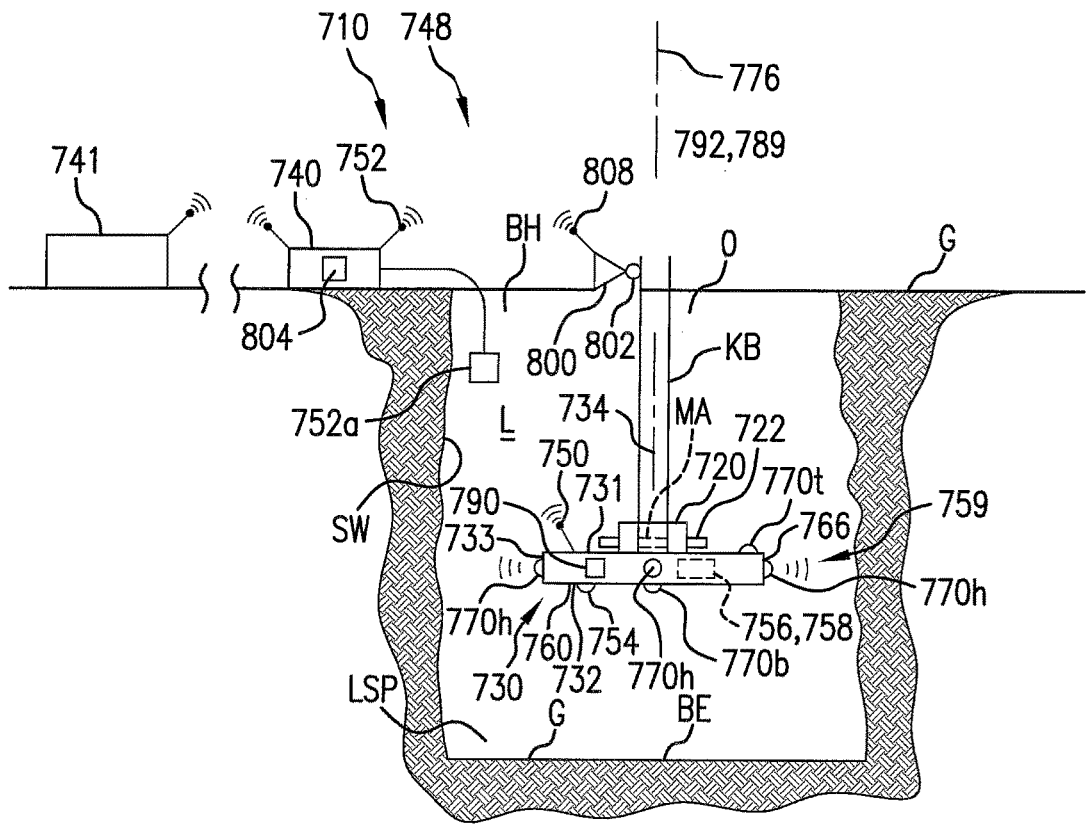
FIG. 15 is a side elevational view a borehole inspection device according to certain other aspects of the present invention that is positioned within a bore and/or excavation hole.
Figure 16:
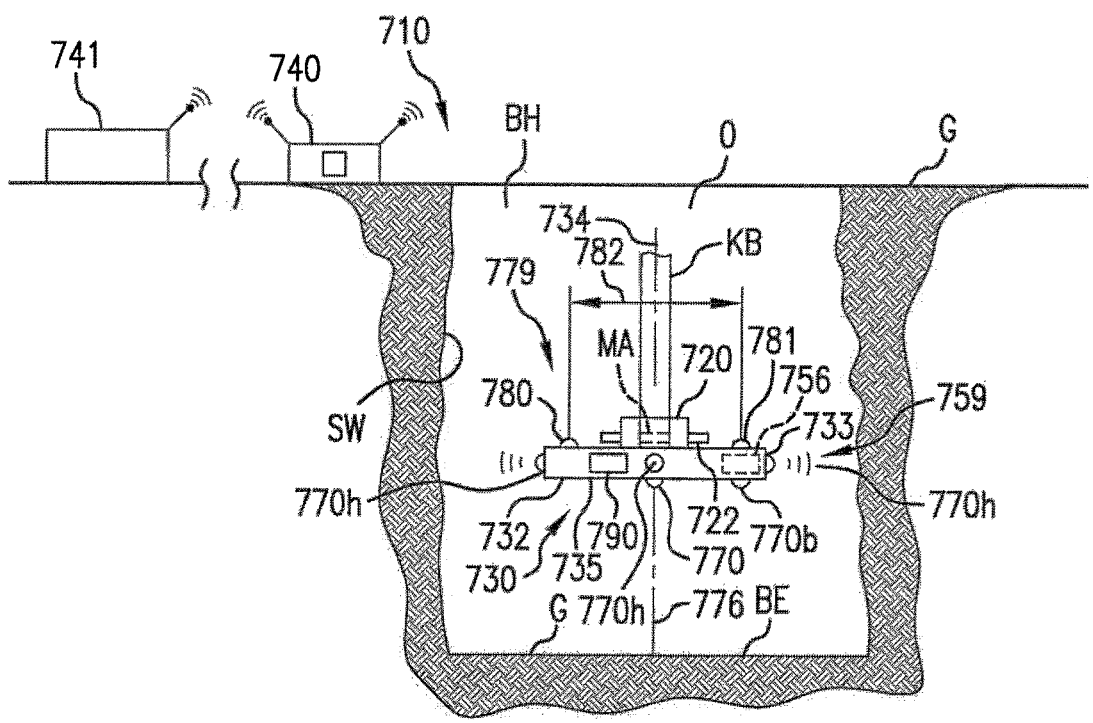
FIG. 16 is a side elevational view the borehole inspection device shown in FIG. 15 descending within a slurry.
Figure 17:
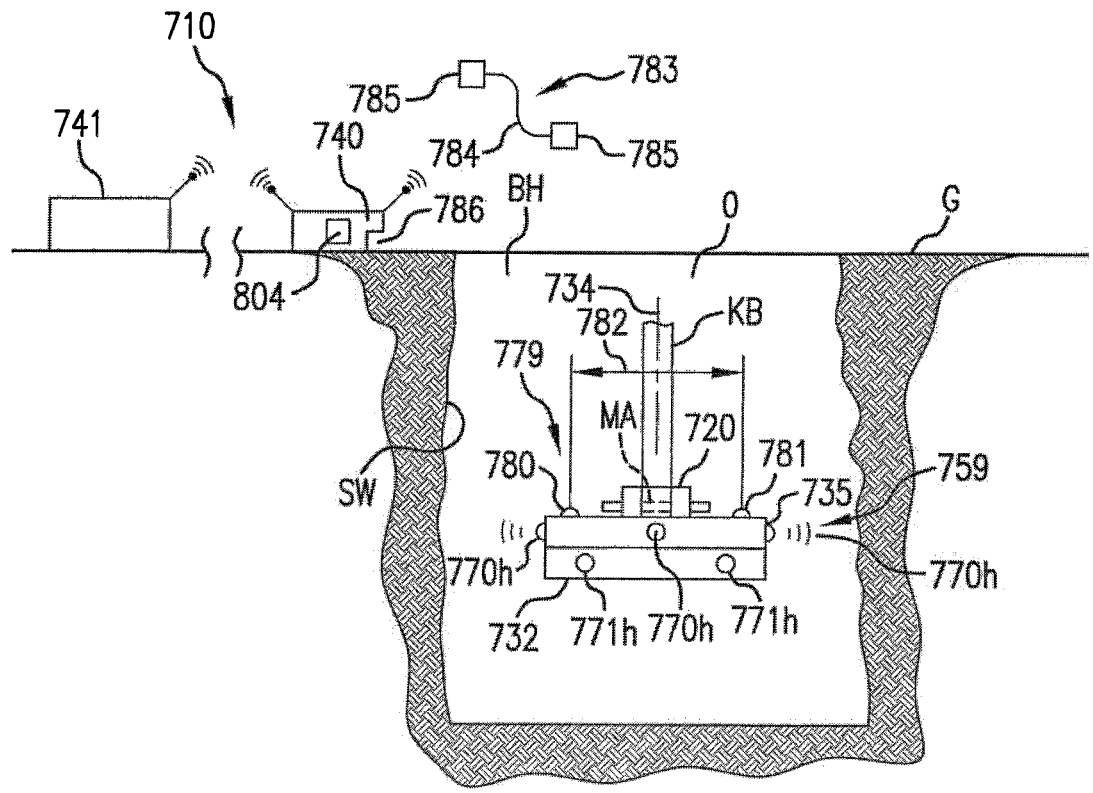
FIG. 17 is a side elevational view yet another borehole inspection device according to certain other aspects of the present invention that is positioned within a bore and/or excavation hole.
Figure 18:
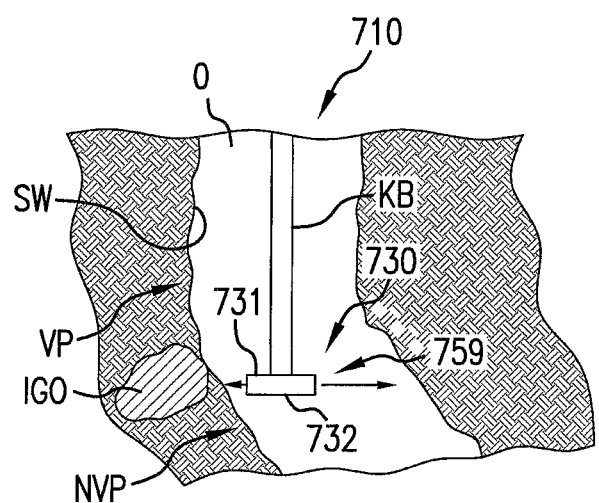
FIG. 18 is a side elevational view yet another borehole that includes a non-vertical section.

As is shown in FIG. 15, unit 730 includes a sensor arrangement 759 having multiple sensors 770. Again, this reduces the need to rotate head unit 730. Sensors 770 includes a first set of sensors (770h) positioned on the one or more of side edges 766 of head unit 730 circumferentially spaced about axis 734 or at least radially extending from axis 734. In the embodiment shown in FIG. 15, there are four horizontal sensors 770h circumferentially spaced about head axis 734. However, as is shown in FIGS. 19-22, more or less sensor could be used without detracting from the invention of this application. As can be appreciated, more sensors can improve resolution, reduce testing times and/or reduce the number of measuring cycles. By including the use of wireless technology and anti-rotation sensor arrangements to prevent the need to rotate the head, head unit 730 operation can be simplified significantly, testing times can be improved and accuracies can be improved. Further, the head unit can be a self contained head unit that can be quickly set up and lowered into the borehole. In one set of embodiments, head unit 730 includes support bracket 720 that can work in connection with mount MA on existing lowering systems being used at the jobsite, such as Kelly Bar KB and/or lowering cables. Again, while any mounting arrangement could be used to secure head unit 730 to a lowering device, Kelly Bar KB, shown mount 720 utilizes pin 722 to secure head unit 730 to the Kelly Bar.

Again, the data collected by sensor arrangement 759 from sensors 770 can be transmitted to the surface unit 740 by way of the wireless technology. In one set of embodiments, the wireless communication is by communication system 748 and antennas 750 and 752 or 752a. In another set of embodiments, data is communicated directly from head unit after the data collection phase. In this respect, unit 730 can be self contained during at least the data collection phase of the operation. Moreover, internal measurement system 758 of head unit 730 can include a memory 796 and memory 796 can include operating instructions for a head processer 798 to control the data collection phase, store the data collected during the data collection phase and/or communicate the data during the data transmission phase. In some embodiments, the memory for the data memory is independent of the memory for the operating instructions. Then, after the data collection phase is concluded, the head unit can be raised to the top and the data can be downloaded from head unit 730 directly after it has surfaced. This extraction of data can also be by way of wireless communication using antenna 750 and/or it could include a wired communication arrangement 783. Wired communication arrangement 783 can include a selectively securable cable 784 having cable connections 785 wherein cable 784 can be selectively securable between a data port 786 in surface unit 740 and/or 741 and a data port 788 in head unit 730. In addition, this can be limited to when the head unit is in the data transmission phase, which can be when the head unit is at least partially out of the borehole. As can be appreciated, wireless and/or wired communication between head unit 730 and surface unit 740 and/or 741 is much different when the head unit is out of the borehole than communication with head unit 730 when it is in the borehole during the data collection phase. Again, any communication system and/or technology could be used including all of the typical wireless RF or optical communication links used by industry. RF links include, but are not limited to, BLUETOOTH®, ZigBee®, Wi-Fi, Universal Serial Bus and RS232 communication standards and/or systems. Optical communication links include, but are not limited to, Li-Fi.

While mounting head unit 730 to the Kelly Bar can allow the head unit to be rotated, the exact angle of rotation would be needed to accurately determine the portion of the side wall and/or bottom wall being measured at any given time. In the embodiment shown in FIG. 15, head unit 730 includes sensor arrangement 759 having five sensors 770. These include four horizontal sensors 770h and one bottom sensor 770b. Again, more or less than five sensors could be used without detracting from the invention of this application.

Again, sensors 770 in one set of embodiments can be one or more ultrasonic sensors that can be used to detect the spacing or distance between the sensor and the side wall. Multiple readings from multiple sensors can then be used to calculate the shape and/or configuration of any surface within the borehole. In particular, horizontal sensors 770h can be used to detect and determine the shape and/or overall radius of the sidewall(s) of the borehole. Bottom sensor or sensors 770b can be used to detect and determine the shape of bottom surfaces BE of the borehole. Alternatively, bottom sensor or sensor 770b can be used to detect and determine the location of bottom extent BE and/or lower stop point LSP.

Figure 23:
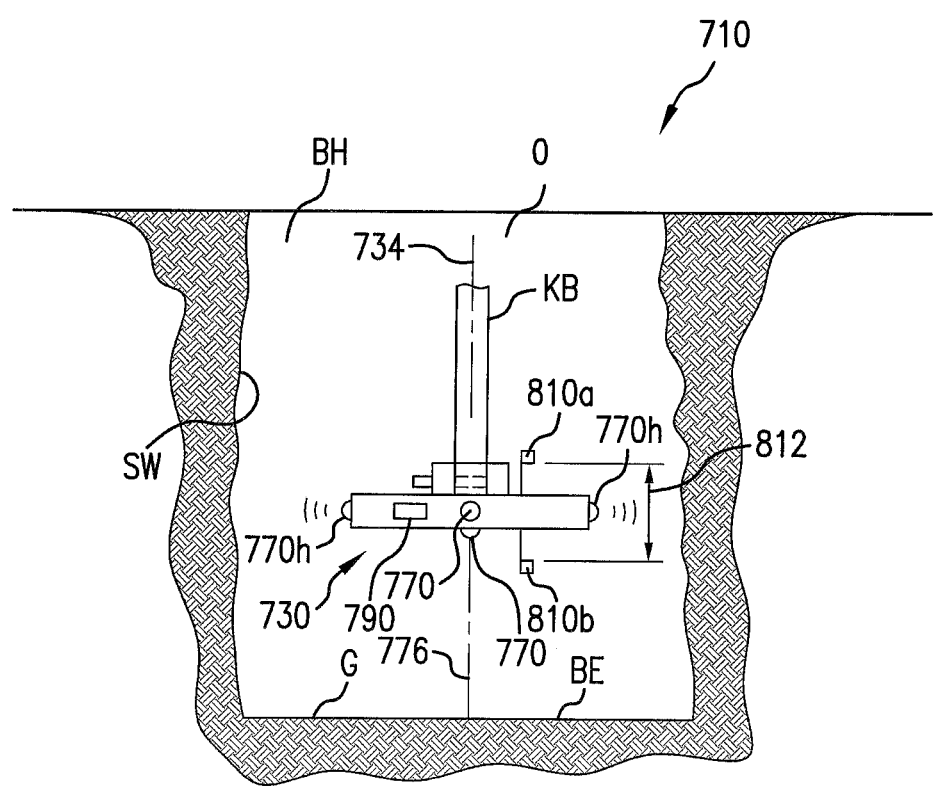
FIG. 23 is a side elevation view of another embodiment of the borehole inspection device of this application with dual pressure sensors; and, FIG. 24 is a schematic representation of a measurement system for a part of the system.
Figure 24:
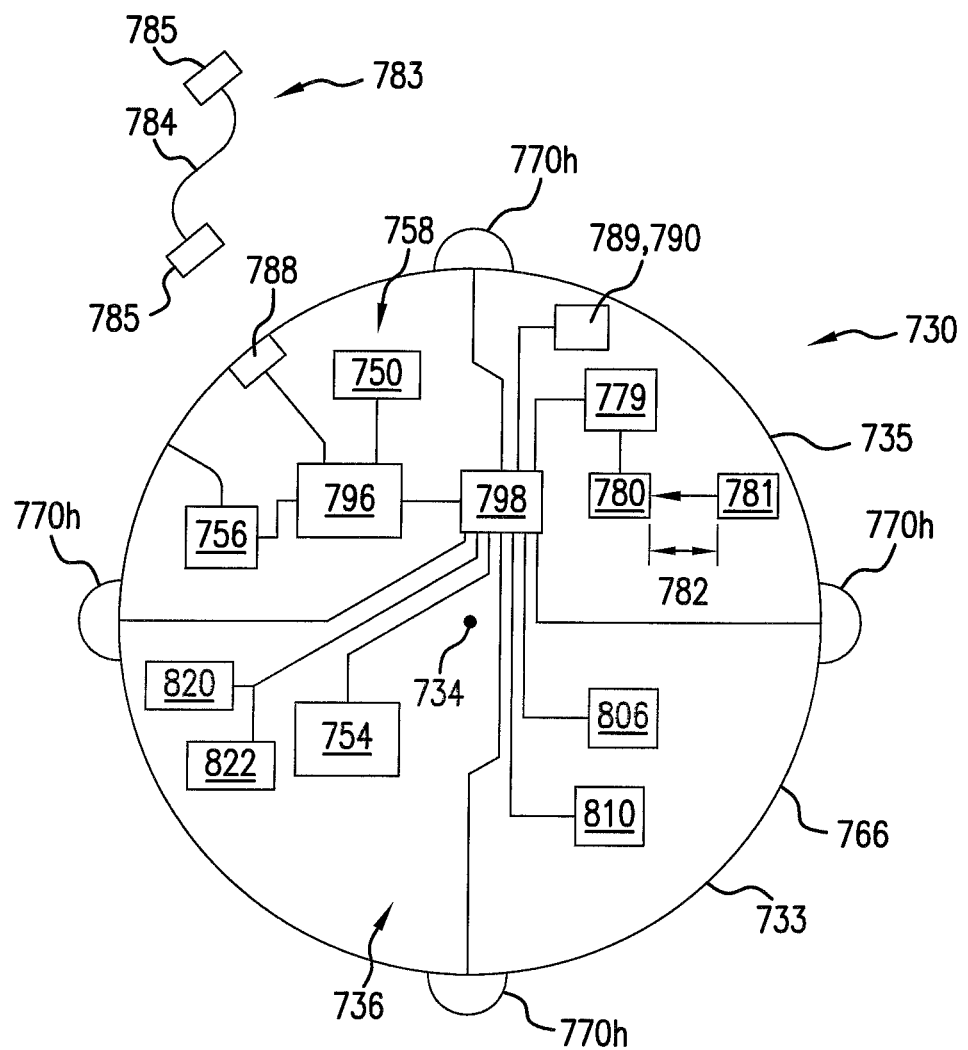

In another set of embodiments, sensors 770 can include one or more laser and/or optical sensor could be utilized to take the same or similar readings. These sensors are intended for holes that are not filled with a slurry. In addition, in at least one set of embodiments, the device can include sensor arrangement 759 with a combination of sensors wherein the one or more ultrasonic sensors can be utilized in the scanning within a liquid or slurry and the one or more laser, ultrasonic and/or optical sensors could be utilized in dry conditions. With special reference to FIG. 17, sensor arrangement 759 can include a first array or plurality of test data sensors 770h and a second array or plurality of test data sensors 771h. These arrays of sensors extend about unit axis 734 and/or can be positioned in multiple layers and/or sensor arrays that can include use of the same sensor technology and/or different sensor technology. In this respect, an increasing number of sensors can be used to improve the angular resolution of the device. Different scan technology can be used to allow one head unit 730 to work in different borehole environments. Therefore, at least one set of embodiments includes sensors positioned about most of the side(s) (at least radially outwardly) of the device to improve resolution. If a sensor is used that includes a narrow sensor range that are highly directional, a greater number of sensors could be used without interference with adjacent sensors. As noted above, this can improve angular resolution. In one set of embodiments, this can include over ten sensors spaced about the side or radially extending from unit axis 734 of the head device. FIG. 23 shows 16 sensors 770h. According to another set of embodiments, over twenty sensors could be positioned about the side or radially extending from unit axis 734 of the device. According to yet another set of embodiments, over thirty sensors could be positioned about the side or radially extending from unit axis 734 of the head device. Depending on the size of the side sensors, the head unit and/or other factors, more than one layer or sets of sensors could be positioned about the axis of the device. These other layers or sets could also utilize a different sensor technology. Again, in one mode of operation, the head unit can be lowered into the borehole or excavation (lowering phase) until it reaches lower stop point LSP. Then, head unit 730 and/or sensor arrangement 759 can be partially rotated before the raising phase. This can be used to improve the angular resolution of the device by changing the rotational position of the device when raised to change the rotational orientation of the sensors relative to the wall(s). This rotation method can also be used to address gaps in the sensors' data when fewer sensors are used and/or when highly directional sensors are used.

According to yet another set of embodiments, sensor arrangements 759 can further include one or more calibration sensor arrangements 779. Calibration sensors can have a wide range of functions including, but not limited, depth measurement and/or confirmation, density measurement and/or confirmation, and/or other operational functions. These include one or more sensors configured to measure the density of the slurry about head unit 730 as will be discussed more below. In this respect, head unit 730 can include one or more devices, like the scanners and/or sensors described above, that are directed toward other devices at known locations, which can be used to determine and account for the changes in slurry densities as the devices is lowered into the borehole. In this respect, the fluid or slurry that is used to maintain the borehole until it is filled with material to be solidified, such as grout, has different densities at different depths. Further, changes in density will affect the wave speed of the sonar sensors of sensor 770 wherein wave speed slows as density increases. Therefore, the accuracy of the system can be impacted as the density of the slurry changes. In order to account for the changes in slurry density, the invention of this application can further include one or more density sensors 780. Sensor 780 can be a single unit device directed toward an object at a known location 781 or a transmitter 780 and a receiver 781 at a known location wherein units 780 and 781 are spaced from one another by a known spacing 782. In that the spacing is known, density sensor 780 can be utilized to calibrate head 730 and/or system 710 by calculating changes in the slurry density. This calibration information can then be used to adjust sensor readings from sensors 770. Yet further, the density sensor 780 could also work with depth sensors, such as pressure sensors 810, which will be discussed more below. This can be used to increase accuracies of the depth measurement of the system and/or the accuracy of the sensors.

Again, in one set of embodiments, device 780 can be a transmitting device and device 781 can be a receiving device wherein known spacing 782 is the distance between the transmitter and the receiver. The density measurement can then be made by tracking the time delay, and changes in time delay, from the received signal sent from the transmitter to the receiver. This can then be used to adjust sensor readings from sensors 770 to account for the changing density of the slurry at any depth within the borehole. Further, receiver 781 could also be used in combination with one of sensors 770 wherein at least one of sensors 770 acts as unit 780 and receiver 781 is positioned at know distance 782 from the one of sensors 770. Again, the changes in transmission times from receiver 781 can be used to calculate density. Calibration system along with density sensor 780 and receiver 781 can be a part of measurement system 758.

Borehole inspection device 710 can further include one or more depth measurement systems 789. As can be appreciated, knowing the depth of head 730 and/or sensor arrangement 759 is important to know where the scanned images are located within the borehole. Depth measurement systems 789 can include one or more internal measuring systems 790, that can be part of system 758 of head unit 730. System 790 can include, but is not limited to, accelerometers, gyroscopes, ultrasonic sensors, altimeter(s) 791, and/or pressure sensors 810 to determine the depth of the system within the borehole and/or changes in depth. And, these systems can be used with other systems to determine current depth for head 730. Yet further, the depth measurement systems 789 can include a rotary encoder 792 fixed relative to a Kelly Bar, a lowering cable, main line and/or other lowering device, that can measure depth either independently and/or in combination with the other systems within head unit 730. The rotary encoder 792 can include a support 800 and a wheel 802 wherein wheel 802 is configured to engage Kelly Bar KB, wire or lowering device. When used in combination, the rotary encoder can be synced with the systems onboard the head unit. In this respect, both the surface systems, such as surface unit 740 and/or encoder 792, can include a timing device or clock 804 and head unit 730 can include a timing device or clock 806. Clocks 804 and 806 can be synchronized so that sensors 770 can take readings or be pinged against side wall(s) SW based on a unit of time. If the clocks are synchronized and head unit 730 is lowered during the lowering and raised during the raising phases at a known rate, the depths for each "ping" can be determined based on time. In addition, the accelerometers, pressure sensors and/or altimeters can further improve accuracies in depth measurement and/or lowering rate. The use of rotary encoder, accelerometers and/or altimeters in combination with wireless technology eliminates the need for wire and/or lines connecting the device to surface systems and/or operator(s) monitoring the borehole inspection. Yet further, encoder 792 can include a wireless system 808 that allows communication between encoder 792 and head 730 and/or surface unit 740, 741.

According to one set of embodiments, and with special reference to FIG. 23, head unit 730 can include one or more pressure sensors 810 to measure depth in the borehole alone or in combination with other systems described above. It is preferred that at least two pressure sensors be used to measure depth. More particularly, head unit 730 can include a first pressure sensor 810a and a second pressure sensor 810b. Moreover, pressure sensor 810a can be an upper sensor and pressure sensor 810b can be a lower sensor that are axially spaced relative to head axis 734 and which are separated by a known spacing 812. Known spacing 812 can be any known spacing. In one set of embodiments, spacing 812 can be approximately 12 inches. In one set of embodiments, spacing 812 is in the range of about 6 inches to 36 inches. In another set of embodiments, spacing 812 is between about 8 inches and 24 inches. In one embodiment, it is greater than 6 inches. In that spacing 812 is a known spacing, sensors 810 can confirm vertical movement by the changes in pressure. For example, movement of head by sensor spacing 812 should result in pressure sensor 810a reading the same pressure after the movement as sensor 810b read before the movement. This can be used to determine and/or confirm depth. Depth can be calculated in the same way wherein it can be determined that the head unit has moved by the distance of spacing 812 once sensor 810a reads the pressure of sensor 810b before the movement began. As a result, an analysis of the pressures of both sensors can be utilized to track depth and/or to confirm depth. As with other aspects of the system and/or arrangement, this data can be stored and/or communicated to other parts of the system in real time and/or during the data transmission phase.

In addition, the one or more accelerometers 820 and/or gyroscopes 822 can be utilized to calculate the verticality of the hole being scanned. In greater detail, and with special reference to FIG. 18, when borehole O is bored, the boring tool can encounter an in ground obstacle IGO that can cause deflection of the bore wherein the bore opening can in include a vertical portion VP and a non-vertical portion NVP. The accelerometers and/or gyroscopes can confirm the verticality of head unit head 730 and/or sensor arrangement 759 to maintain and/or determine if head unit axis 734 is plumb to allow head unit to detect the verticality of the borehole opening. Further, the accelerometers and/or gyroscopes can be used with other components in system 710 to lower the head unit into the opening. This information can then be used in combination with sensor data from sensors 770 to allow both hole size determination and verticality determination of opening O to determine when it has transition from a vertical section to a non-vertical section and/or vice versa.

According to even yet further aspects of the present invention, the use of the rotary encoder, accelerometers and/or altimeters in combination with wireless technology improves the system's ability to work in a semi-automated and/or fully automated mode of inspection. Yet further, these modes of operation can allow multiple boreholes to be inspected simultaneously with a single surface unit device or system wherein at least one embodiment includes multiple head units that communicate with a single surface unit and/or off-site unit.

The systems and devices of this application can work together to allow inspection device 710 to be a quickly deployed borehole measuring system that can operate in a wide variety of borehole configurations and sizes without significant set up. Yet further, the systems of this application can work in combination with other sensing devices without detracting from the invention of this application.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

It is claimed:

1. An inspection system to measure the condition of a side wall of an opening extending along an opening axis extending into the ground; the inspection system comprising a head unit configured to move along an associated opening axis of an associated ground opening; the head unit being movable along the associated opening axis during a data collection phase, the data collection phase including at least one of a lowering phase wherein the head unit is moving in the associated borehole toward an associated bottom extent of the associated ground opening and a raising phase wherein the head unit is moving in the associated ground opening away from the associated bottom extent of the ground opening; at least one set of test data being collected concerning one or more physical characteristics of the associated side wall of the associated ground opening during the data collection phase, the head unit comprising a sensor arrangement that includes a plurality of test data sensors facing radially outwardly of and circumferentially spaced about a head axis that is generally parallel to at least a portion of the associated opening axis, the plurality of test data sensors of the sensor arrangement allowing the head unit to be moving during the data collection phase without rotation of the head unit or the plurality of test data sensors about the head axis, the plurality of test data sensors at least partially producing the at least one set of test data collected during the data collection phase while the head unit is moving; the head unit including at least one of a calibration sensor and a control sensor; the at least one calibration sensor and control sensor including at least one of a depth sensor, a head verticality sensor, a density sensor, a wave speed sensor for the plurality of sensors, a liquid sensor and a pressure sensor.

2. The inspection system of claim 1, wherein the at least one calibration and control sensor includes at least one of an accelerometer, a gyroscope, an ultrasonic sensor and an altimeter.

3. The inspection system of claim 1, wherein the head unit includes a wireless operating system wherein the head unit operates wirelessly during the data collection phase.

4. The inspection system of claim 3, wherein the wireless operating system includes preprogramed operation modes for movement of the head unit and data collection during the data collection phase.

5. The inspection system of claim 1, wherein the plurality of test data sensors is a first plurality of test data sensors and the head unit further includes a second plurality of test data sensors and a third plurality of test data sensors; the second plurality of test data sensors faces axially relative to the head axis; the third plurality of test data sensors faces radially relative to the head axis.

6. The inspection system of claim 5, wherein at least one of the second plurality of test data sensors faces axially downwardly toward the associated bottom extent of the associated ground opening.

7. The inspection system of claim 1, wherein the head includes an internal measurement system with an operating system, the internal measurement system having an internal power supply and a data store, the data store providing at least one of commands for the operation of the head unit during the data collection phase and data storage for the storage of the at least one set of test data during the data collection phase.

8. The inspection system of claim 7, wherein the operating system at least in part controls the head unit movement along the associated opening axis during the data collection phase.

9. The inspection system of claim 1, wherein the plurality of test data sensors is a first plurality of test data sensors and the head unit further includes a second plurality of test data sensors.

10. The inspection system of claim 9, wherein the second plurality of test data sensors faces axially relative to the head axis.

11. The inspection system of claim 9, wherein at least one of the second plurality of test data sensors faces axially downwardly toward the associated bottom extent of the associated ground opening.

12. The inspection system of claim 9, wherein the second plurality of test data sensors faces radially relative to the head axis.

13. The inspection system of claim 1 further including a surface unit outside of the associated ground opening that is separate from the head unit and a wireless communication system between the head unit and the surface unit allowing wireless communication between the surface unit and the head unit during the data collection phase.

14. The inspection system of claim 13, wherein the surface unit at least in part controls the head unit movement along the associated opening axis during the data collection phase.

15. The inspection system of claim 13, wherein the surface unit includes an off site computing system.

16. The inspection system of claim 13, wherein the surface unit includes an off-site control and/or display unit.

* * * * *